United States Patent
Lim et al.

(10) Patent No.: US 11,757,581 B2
(45) Date of Patent: Sep. 12, 2023

(54) USER EQUIPMENT FOR SUPPORTING EN DC, AND CONTROL METHOD THEREFOR

(71) Applicant: LG ELECTRONICS INC., Seoul (KR)

(72) Inventors: Suhwan Lim, Seoul (KR); Jaehyuk Jang, Seoul (KR); Sangwook Lee, Seoul (KR); Joohee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 17/263,746

(22) PCT Filed: Jul. 30, 2019

(86) PCT No.: PCT/KR2019/009471
§ 371 (c)(1),
(2) Date: Jan. 27, 2021

(87) PCT Pub. No.: WO2020/032459
PCT Pub. Date: Feb. 13, 2020

(65) Prior Publication Data
US 2021/0376972 A1   Dec. 2, 2021

(30) Foreign Application Priority Data

Aug. 10, 2018   (KR) .................. 10-2018-0094052
Sep. 28, 2018   (KR) .................. 10-2018-0115417

(51) Int. Cl.
*H04L 5/00*    (2006.01)
*H04W 52/24*   (2009.01)
*H04W 52/42*   (2009.01)

(52) U.S. Cl.
CPC .......... *H04L 5/0032* (2013.01); *H04L 5/0041* (2013.01); *H04W 52/243* (2013.01); *H04W 52/42* (2013.01)

(58) Field of Classification Search
CPC .......... H04L 5/0035; H04L 5/14; H04L 5/007
See application file for complete search history.

(56) References Cited

U.S. PATENT DOCUMENTS

2016/0112964 A1*  4/2016  Lim ................. H04W 72/0473
                                                          455/452.2
2016/0242128 A1   8/2016  Loehr et al.

FOREIGN PATENT DOCUMENTS

KR  10-2015-0109970  10/2015
WO  2018-088953      5/2018

OTHER PUBLICATIONS

ETSI TS 138 101-3 V15.2.0 (Jul. 2018).*
(Continued)

*Primary Examiner* — Abdelillah Elmejjarmi
(74) *Attorney, Agent, or Firm* — BRYAN CAVE LEIGHTON PAISNER LLP

(57) ABSTRACT

A disclosure of the present specification provides a user equipment (UE) supporting a Dual Connectivity (DC) with Evolved Universal Terrestrial Radio Access (E-UTRA) and New Radio (NR). The UE may include a transceiver configured with the DC and configured to transmit an uplink signal and receive a downlink signal; and a processor configured to control the transceiver. Wherein based on (i) that the E-UTRA includes at least E-UTRA operation band 41, (ii) that the NR includes at least NR operation band 41, and (iii) that a band to be protected is a first band, the transceiver may be configured with a predetermined maximum level of a spurious emission.

8 Claims, 21 Drawing Sheets

(56) References Cited

OTHER PUBLICATIONS

3GPP TR 37.863-01-01 V15.0.0 (Jun. 2018).*
Nokia et al., "Introduction of NR operation in MSR specification," 37.104, R4-1808424, TSG-RAN WG4 Meeting #87, Busan, Korea, Jun. 6, 2018, see sections 3.1, 6.6.1.3.1; and tables 4.5-1-4.5-2, 6.6.1.3.1-4.
Oppo, "Clarification of EN-DC UE requirements with NR in FR2," R4-1806817, 3GPP TSG-RAN WG4 Meeting #87, Busan, Korea, Jun. 6, 2018, see section 6.5B.3.4.1.

* cited by examiner

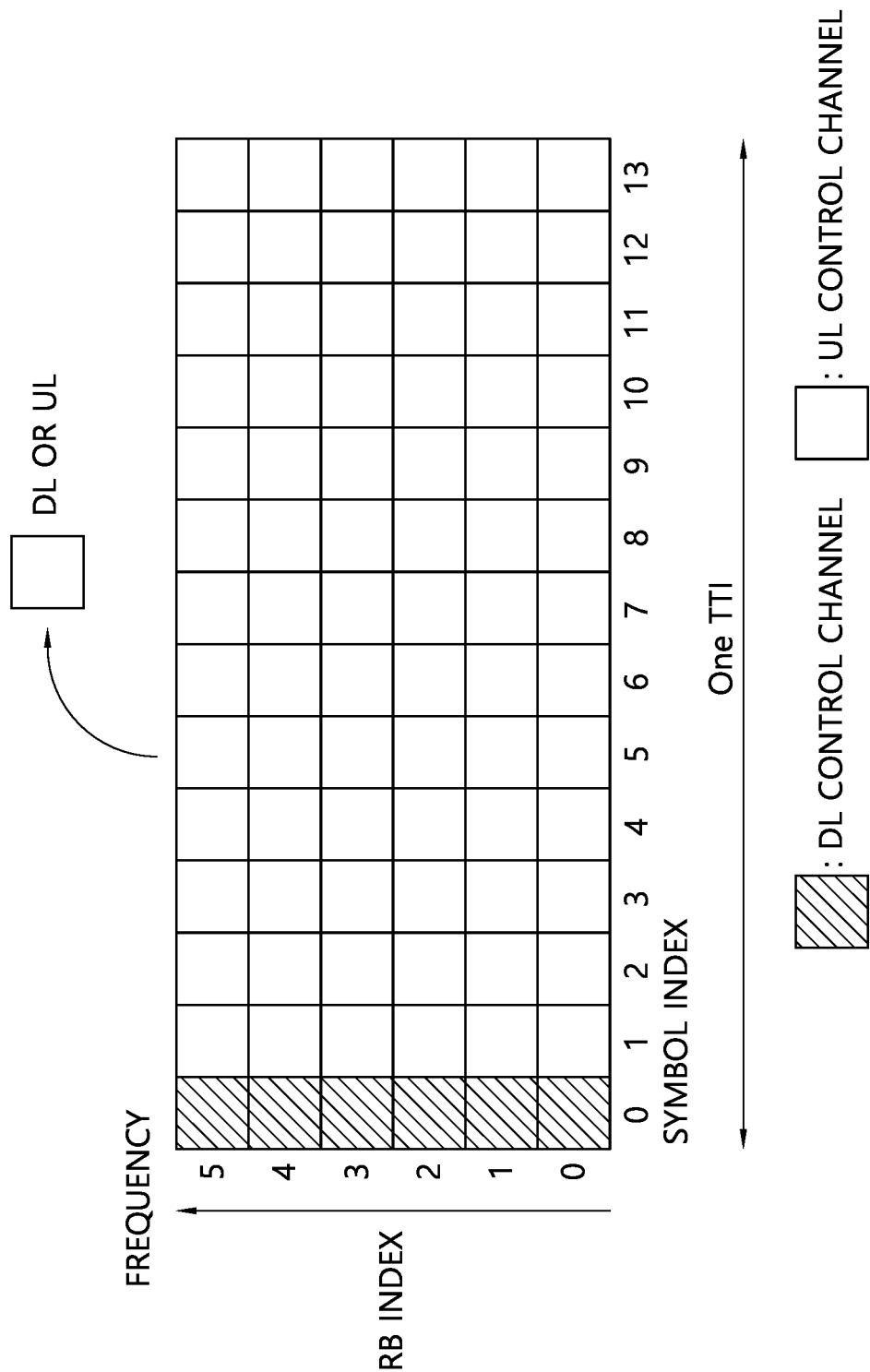

FIG. 10B

Intra-band contiguous 41/n41 EN-DC Case.
- UL non-contiguous resource allocation.
- LTE SC-FDMA/QPSK, NR DFT-s-OFDM/QPSK

| LTE 20MHz | | NR 40/60/80/100 MHz | | | 3GPP AMPR value TS38.101-3 | | LGE Test Result | | | | | | |
|---|---|---|---|---|---|---|---|---|---|---|---|---|---|
| | | | | | | | Tx power backoff [dB] | | | | | | |
| | | | | | | | 6.5B.4 Additional spurious emissions | NS04/ General SEM | EN-DC ACLR | EN-DC UE co-existence | | | Spurious emissions |
| | | | | | | | 38.101-3 | R4-1805732 & TS38.101-3 | 38.101-3 | EN-DC 38.101-3 Test for Type1 UE | | | R4-1808123 |
| | | | | | | | | | | B40 | | B30 Rx | B1/4/66 Rx |
| SCS | transmitted LTE RB | SCS | transmitted LTE RB | Total UL RB BW [MHz] | Tyep1 UE | EN-DC AMPR | -25dBm/MHz f<ENBW | -13dBm/MHz f<ENBW | | -50dBm /MHz | -40dBm /MHz | -50dBm /MHz | -25dBm /MHz |
| 15KHz | 1 | 30KHz | 1 | 0.54 | 14 | | 11dB | 5dB | 4dB | 19dB | 14dB | 9dB | 4dB | 2dB |
| 15KHz | 6 | 30KHz | 1 | 1.44 | 13 | | 11dB | 5dB | 4dB | 19dB | 14dB | 8dB | 3dB | 2dB |
| 15KHz | 5 | 30KHz | 5 | 2.7 | 12 | | 10dB | 3dB | 4dB | 18dB | 13dB | 7dB | 2dB | - |
| 15KHz | 12 | 30KHz | 1 | 2.52 | 12 | | 9dB | 2dB | 4dB | 17dB | 12dB | 6dB | 2dB | - |
| 15KHz | 10 | 30KHz | 10 | 5.4 | 11 | | 10dB | 4dB | 4dB | 17dB | 12dB | 6dB | 2dB | - |
| 15KHz | 15 | 30KHz | 15 | 8.1 | 11 | | 8dB | 1dB | 4dB | 16dB | 11dB | 6dB | 1dB | - |
| 15KHz | 30 | 30KHz | 1 | 5.76 | 11 | | 8dB | 2dB | 4dB | 16dB | 11dB | 6dB | 2dB | - |
| 15KHz | 20 | 30KHz | 20 | 10.8 | 11 | | 7dB | 1dB | 4dB | 16dB | 11dB | 5dB | 1dB | - |
| 15KHz | 25 | 30KHz | 25 | 13.5 | 11 | | 6dB | - | 4dB | 16dB | 10dB | 5dB | 1dB | - |
| 15KHz | 30 | 30KHz | 30 | 16.2 | 11 | | 6dB | - | 4dB | 15dB | 10dB | 5dB | - | - |
| 15KHz | 35 | 30KHz | 35 | 18.9 | 11 | | 6dB | - | 5dB | 15dB | 9dB | 4dB | - | - |
| 15KHz | 40 | 30KHz | 40 | 21.6 | 11 | | 5dB | - | 5dB | 15dB | 9dB | 4dB | - | - |
| 15KHz | 45 | 30KHz | 45 | 24.3 | 11 | | 5dB | - | 5dB | 15dB | 9dB | 4dB | - | - |
| 15KHz | 50 | 30KHz | 50 | 27 | 11 | | 5dB | - | 5dB | 15dB | 9dB | 4dB | - | - |

FIG. 11B

Intra-band contiguous 41/n41 EN-DC Case.
- UL non-contiguous resource allocation.
- LTE SC-FDMA/QPSK, NR DFT-s-OFDM/QPSK

| LTE 20MHz | | NR 40/60/80/100 MHz | | | 3GPP AMPR value TS38.101-3 | | LGE Test Result | | | | | | |
|---|---|---|---|---|---|---|---|---|---|---|---|---|---|
| | | | | | | | Tx power backoff [dB] | | | | | | |
| | | | | | | | EN-DC 38.101-3 Test for Type1 UE | | | | | | |
| SCS | transmitted LTE RB | SCS | transmitted LTE RB | Total UL RB BW [MHz] | Type1 UE | EN-DC AMPR | 6.5B.4 Additional spurious emissions | NS04/General SEM | EN-DC ACLR | EN-DC UE co-existence | | | Spurious emissions |
| | | | | | | | | | | (@B40, B30) | | B1/4/66 Rx | R4-1808123 |
| | | | | | | | | | | -50dBm/MHz | -40dBm/MHz | -50dBm/MHz | -25dBm/MHz |
| | | | | | | | 38.101-3 | -25dBm/MHz | 38.101-3 | | | | |
| 15KHz | 1 | 30KHz | 1 | 0.54 | 14 | | 11dB | 9dB | 9dB | 4dB | 19dB | 14dB | 12dB | 10dB |
| 15KHz | 6 | 30KHz | 1 | 1.44 | 13 | | 11dB | 9dB | 9dB | 4dB | 19dB | 14dB | 11dB | 10dB |
| 15KHz | 5 | 30KHz | 5 | 2.7 | 12 | | 10dB | 7dB | 7dB | 4dB | 18dB | 13dB | 10dB | 8dB |
| 15KHz | 12 | 30KHz | 1 | 2.52 | 12 | | 9dB | 6dB | 6dB | 4dB | 17dB | 12dB | 10dB | 7dB |
| 15KHz | 10 | 30KHz | 10 | 5.4 | 11 | | 10dB | 8dB | 8dB | 4dB | 17dB | 12dB | 10dB | 9dB |
| 15KHz | 15 | 30KHz | 15 | 8.1 | 11 | | 8dB | 5dB | 5dB | 4dB | 16dB | 11dB | 9dB | 5dB |
| 15KHz | 30 | 30KHz | 1 | 5.76 | 11 | | 8dB | 6dB | 6dB | 4dB | 16dB | 11dB | 9dB | 7dB |
| 15KHz | 20 | 30KHz | 20 | 10.8 | 11 | | 7dB | 4dB | 4dB | 4dB | 16dB | 11dB | 8dB | 4dB |
| 15KHz | 25 | 30KHz | 25 | 13.5 | 11 | | 6dB | - | - | 4dB | 16dB | 10dB | 8dB | 3dB |
| 15KHz | 30 | 30KHz | 30 | 16.2 | 11 | | 6dB | - | - | 4dB | 15dB | 10dB | 8dB | 2dB |
| 15KHz | 35 | 30KHz | 35 | 18.9 | 11 | | 6dB | - | - | 5dB | 15dB | 9dB | 7dB | - |
| 15KHz | 40 | 30KHz | 40 | 21.6 | 11 | | 5dB | - | - | 5dB | 15dB | 9dB | 7dB | - |
| 15KHz | 45 | 30KHz | 45 | 24.3 | 11 | | 5dB | - | - | 5dB | 15dB | 9dB | 7dB | - |
| 15KHz | 50 | 30KHz | 50 | 27 | 11 | | 5dB | - | - | 5dB | 15dB | 9dB | 7dB | - |

US 11,757,581 B2

USER EQUIPMENT FOR SUPPORTING EN DC, AND CONTROL METHOD THEREFOR

This application is the National Stage filing under 35 U.S.C. 371 of International Application No. PCT/KR2019/009471, filed on Jul. 30, 2019, which claims the benefit of Korean Patent Application Nos. 10-2018-0094052 filed on Aug. 10, 2018 and 10-2018-0115417 filed on Sep. 28, 2018, the contents of which are all hereby incorporated by reference herein in their entirety.

BACKGROUND OF THE DISCLOSURE

Field of the Disclosure

The present disclosure generally relates to mobile communication.

Related Art

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The NR based cell may be operated in a standalone (SA) scheme but may also be operated in a non-standalone (NSA) scheme. According to the NSA scheme, a UE may access an E-UTRAN (i.e., LTE/LTE-A) based cell and an NR based cell in a dual connectivity (DC) way. Such a dual connectivity is called EN-DC.

In the case that a UE to which EN-DC is set performs a transmission by using two bands, a harmonic component and an intermodulation distortion (IMD) are generated, and this may influence a transmission and reception of another UE that uses an adjacent band. Owing to this, there is a problem that the UE is unable to coexist with another UE that uses an adjacent band.

SUMMARY

Accordingly, a disclosure of the present specification has been made in an effort to solve the aforementioned problem.

In an aspect, a disclosure of the present specification provides a user equipment (UE) for supporting a Dual Connectivity (DC) with Evolved Universal Terrestrial Radio Access (E-UTRA) and New Radio (NR). The UE may include a transceiver configured with the DC is set and configured to transmit an uplink signal and receive a downlink signal; and a processor configured to control the transceiver. Wherein based on (i) that the E-UTRA includes at least E-UTRA operation band 41, (ii) that the NR includes at least NR operation band 41, and (iii) that a band to be protected corresponds to a first band, the transceiver may be configured with a predetermined maximum level of a spurious emission.

The first band may be E-UTRA operation band 30.

The DC may be an intra-band DC.

The DC may be an intra-band non-contiguous DC.

The predetermined maximum level of a spurious emission may be −40 dBm.

The predetermined maximum level of a spurious emission may be applied based on a minimum bandwidth of 1 MHz.

The NR operation band 41 may include a UL frequency range of 2496 MHz to 2690 MHz and a DL frequency range of 2496 MHz to 2690 MHz.

The E-UTRA operation band 41 may include a UL frequency range of 2496 MHz to 2690 MHz and a DL frequency range of 2496 MHz to 2690 MHz.

The E-UTRA operation band 30 may include a UL frequency range of 2305 MHz to 2315 MHz and a DL frequency range of 2350 MHz to 2360 MHz.

The processor may further configured to receive a network signal related to an additional-maximum power reduction (A-MPR).

The predetermined maximum level of a spurious emission may be applied based on the network signal related to A-MPR.

In another aspect, a disclosure of the present specification provides a method for controlling a transceiver of a user equipment (UE) supporting a Dual Connectivity (DC) with Evolved Universal Terrestrial Radio Access (E-UTRA) and New Radio (NR). The method may include receiving a downlink signal by controlling the transceiver; and wherein based on (i) that the E-UTRA includes at least E-UTRA operation band 41, (ii) that the NR includes at least NR operation band 41, and (iii) that a band to be protected is a first band, controlling the transceiver to fulfill a predetermined maximum level of a spurious emission.

Advantageous Effects

According to the present disclosure, the problem of the related art described above can be solved.

BRIEF DESCRIPTION OF THE DRAWINGS

FIG. 4 illustrates an example of a subframe type in NR.

FIG. 10b is an exemplary diagram illustrating an experiment result.

FIG. 11b is an exemplary diagram illustrating an experiment result.

DESCRIPTION OF EXEMPLARY EMBODIMENTS

Figure 1:
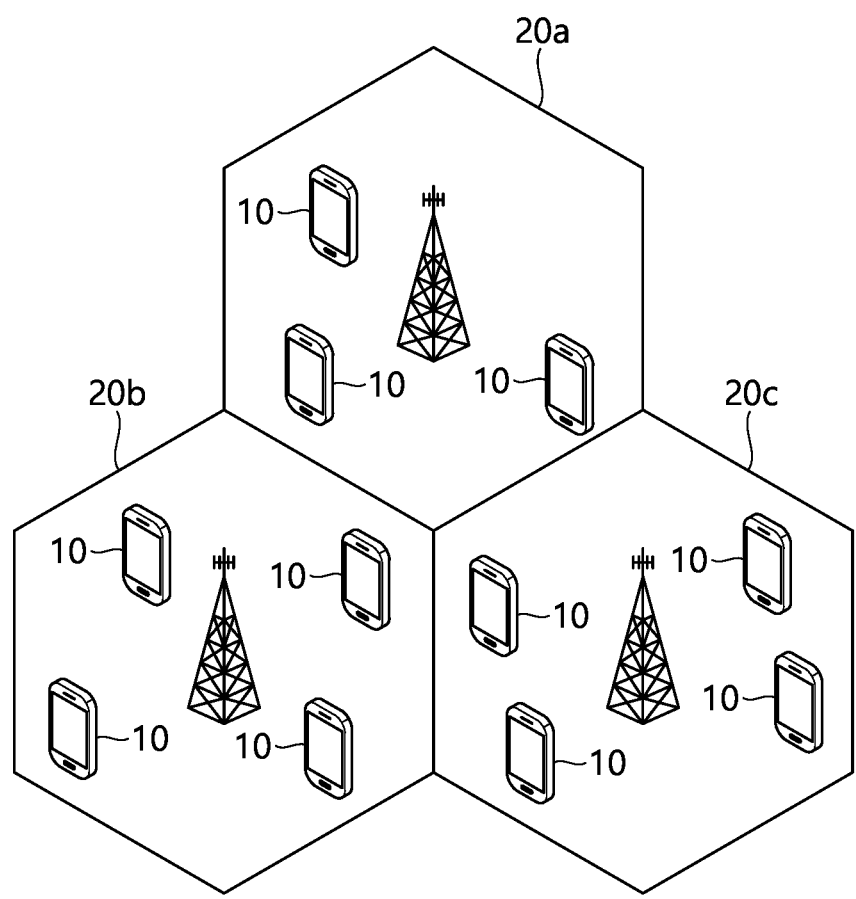
FIG. 1 is a wireless communication system.

Hereinafter, based on 3rd Generation Partnership Project (3GPP) long term evolution (LTE) or 3GPP LTE-advanced (LTE-A), the present disclosure will be applied. This is just an example, and the present disclosure may be applied to various wireless communication systems. Hereinafter, LTE includes LTE and/or LTE-A.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
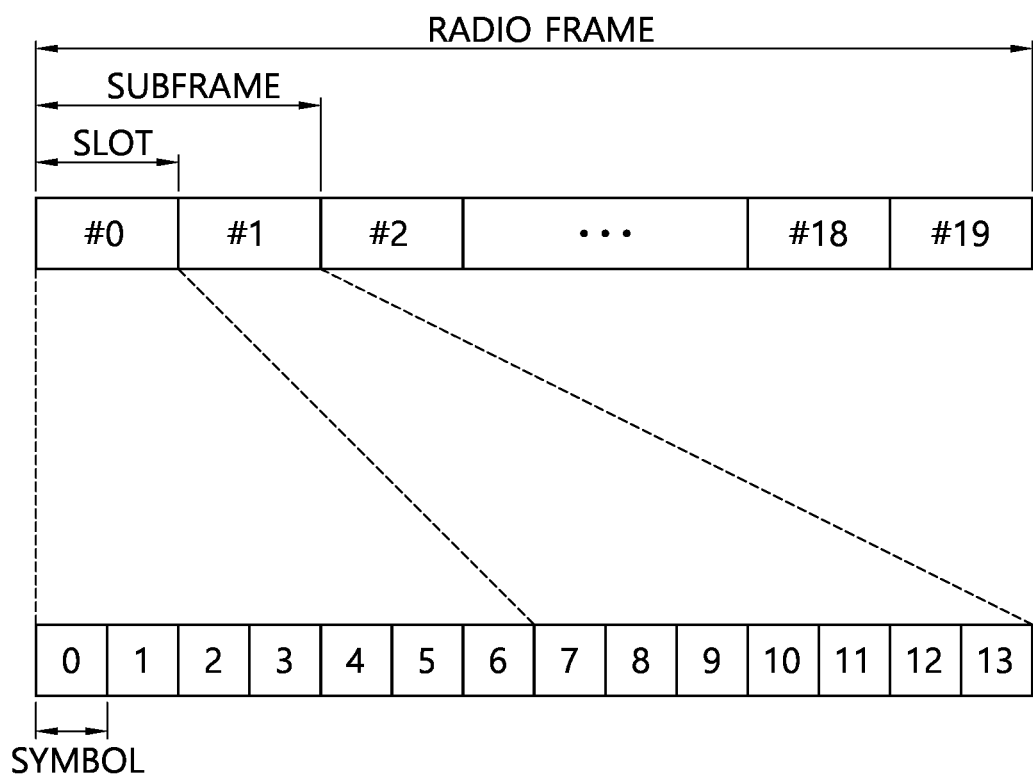
FIG. 2 illustrates a structure of a radio frame according to FDD in 3GPP LTE.

FIG. 2 shows a downlink radio frame structure according to FDD of 3rd generation partnership project (3GPP) long term evolution (LTE).

Referring to FIG. 2, a radio frame includes 10 subframes, and a single subframe includes 2 slots. The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. How many OFDM symbols are included in one slot may vary according to a cyclic prefix (CP).

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Meanwhile, an operation band of Evolved Universal Terrestrial Radio Access (E-UTRA) for LTE/LTE-A is as described below.

TABLE 1

| E-UTRA operation band | Uplink operation band $F_{UL\_low}$-$F_{UL\_high}$ | Downlink operation band $F_{UL\_low}$-$F_{UL\_high}$ | Duplex mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Introduction of Dual Connectivity (DC)>

Recently, a scheme for simultaneously connecting UE to different base stations, for example, a macro cell base station and a small cell base station, is being studied. This is called dual connectivity (DC).

In DC, the eNodeB for the primary cell (Pcell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (Pcell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

<Next-Generation Mobile Communication Network>

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The ITU suggests three usage scenarios, for example, enhanced Mobile BroadBand (eMBB), massive Machine Type Communication (mMTC), and Ultra Reliable and Low Latency Communications (URLLC).

URLLC relates to a usage scenario in which high reliability and low delay time are required. For example, services like autonomous driving, automation, and virtual realities requires high reliability and low delay time (for example, 1 ms or less). A delay time of the current 4G (LTE) is statistically 21-43 ms (best 10%), 33-75 ms (median). Thus, the current 4G (LTE) is not sufficient to support a service requiring a delay time of 1 ms or less. Next, eMBB relates to a usage scenario in which an enhanced mobile broadband is required.

That is, the fifth-generation mobile communication system aims to achieve a capacity higher than the current 4G LTE and is capable of increasing a density of mobile broadband users and support Device-to-Device (D2D), high stability, and Machine Type Communication (MTC). Researches on 5G aims to achieve reduced waiting time and less batter consumption, compared to a 4G mobile communication system, in order to implement the IoT. For the 5G mobile communication, a new radio access technology (New RAT or NR) may be proposed.

Figure 3A:
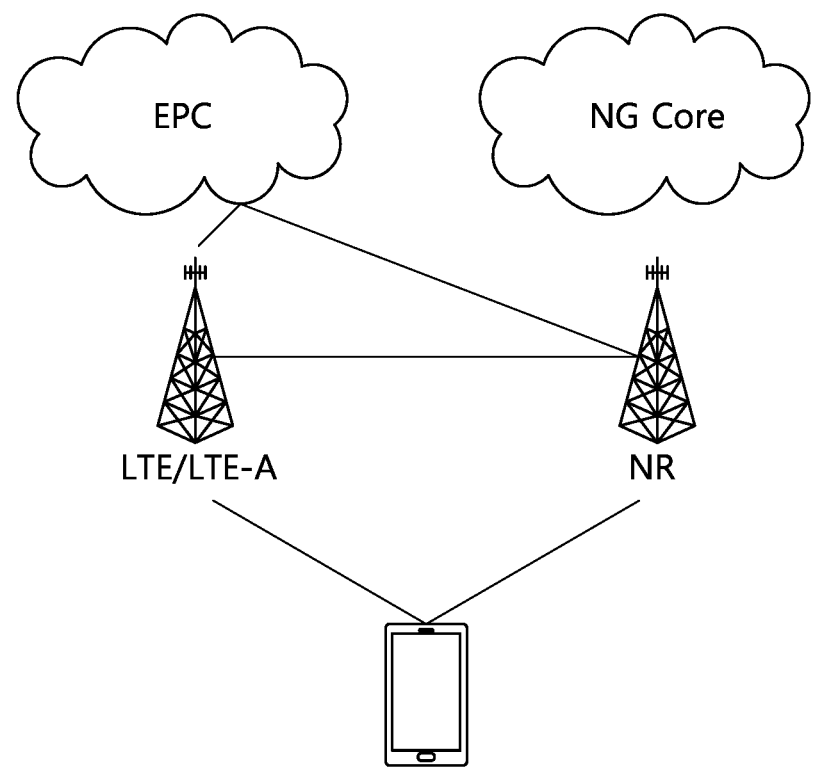
FIGS. 3A to 3C are diagrams illustrating exemplary architecture for a service of the next-generation mobile communication.
Figure 3B:
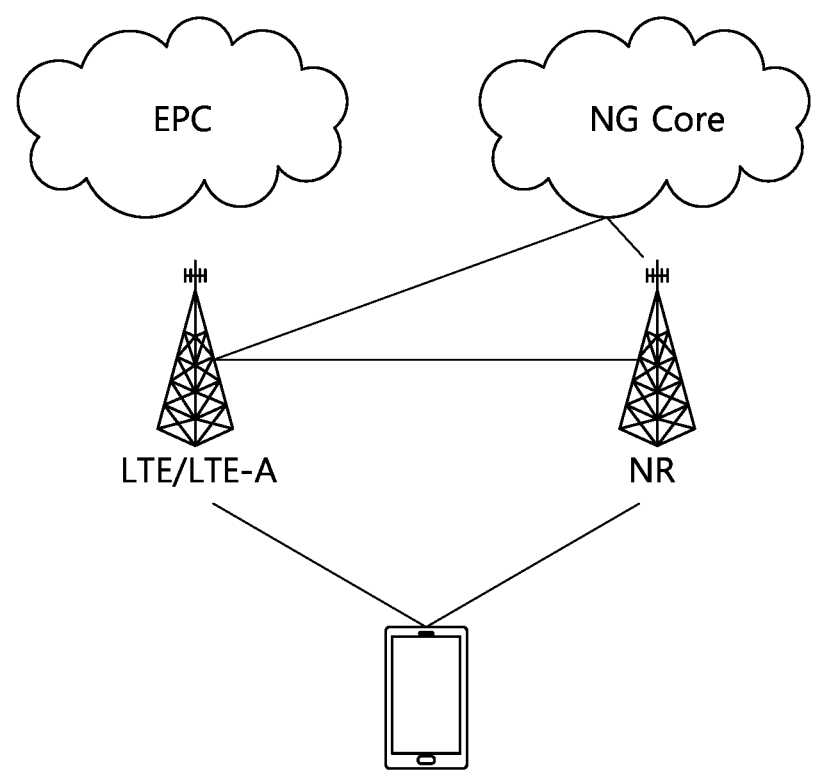
Figure 3C:
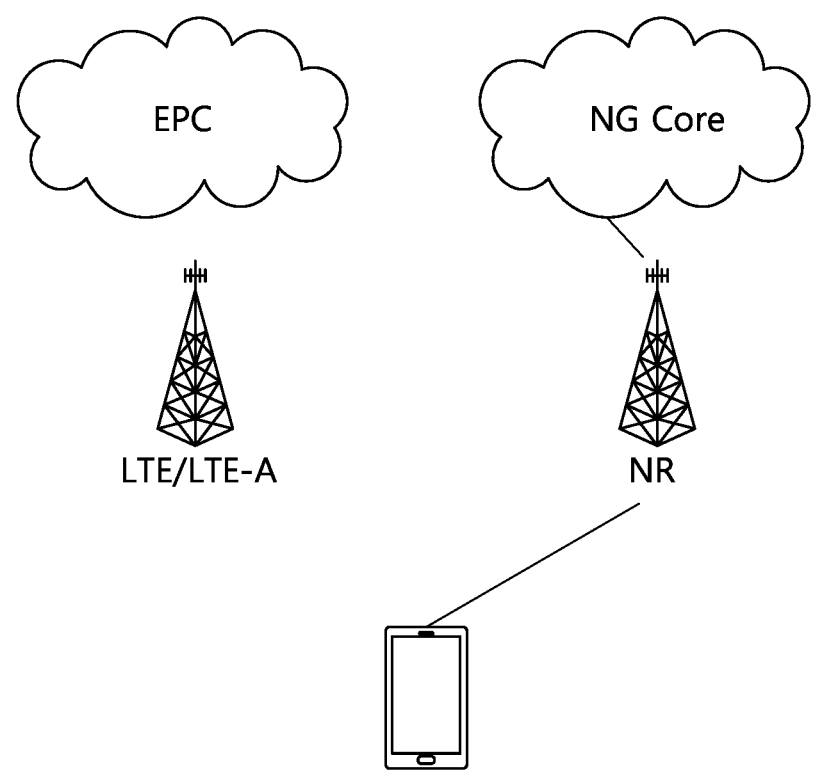

FIGS. 3A to 3C are diagrams illustrating exemplary architecture for a next-generation mobile communication service.

Referring to FIG. 3A, a UE is connected in dual connectivity (DC) with an LTE/LTE-A cell and a NR cell.

The NR cell is connected with a core network for the legacy fourth-generation mobile communication, that is, an Evolved Packet core (EPC).

Referring to FIG. 3B, the LTE/LTE-A cell is connected with a core network for 5th generation mobile communication, that is, a Next Generation (NG) core network, unlike the example in FIG. 3A.

A service based on the architecture shown in FIGS. 3A and 3B is referred to as a non-standalone (NSA) service.

Referring to FIG. 3C, a UE is connected only with an NR cell. A service based on this architecture is referred to as a standalone (SA) service.

Meanwhile, in the above new radio access technology (NR), using a downlink subframe for reception from a base station and using an uplink subframe for transmission to the base station may be considered. This method may be applied to paired spectrums and not-paired spectrums. A pair of spectrum indicates including two subcarrier for downlink and uplink operations. For example, one subcarrier in one pair of spectrum may include a pair of a downlink band and an uplink band.

FIG. 4 shows an example of subframe type in NR.

A transmission time interval (TTI) shown in FIG. 4 may be called a subframe or slot for NR (or new RAT). The subframe (or slot) in FIG. 4 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by $\mu$, a subcarrier spacing and a corresponding CP length may be expressed as shown in the following table.

TABLE 2

| $\mu$ | $\Delta f = 2^\mu \cdot 15$ [kHz] | CP |
|---|---|---|
| 0 | 15 | normal |
| 1 | 30 | normal |
| 2 | 60 | normal, extended |
| 3 | 120 | normal |
| 4 | 240 | normal |

In the case of a normal CP, when an index of a numerology is expressed by $\mu$, the number of OFDM symbols per slot $N^{slot}_{symb}$, the number of slots per frame $N^{frame,\mu}_{slot}$, and the number of slots per subframe $N^{subframe,\mu}_{slot}$ are expressed as shown in the following table.

TABLE 3

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by μ, the number of OFDM symbols per slot Nslotsymb, the number of slots per frame Nframe,μslot, and the number of slots per subframe Nsubframe,μslot are expressed as shown in the following table.

TABLE 4

| μ | $N^{slot}_{symb}$ | $N^{frame, \mu}_{slot}$ | $N^{subframe, \mu}_{slot}$ |
|---|---|---|---|
| 2 | 12 | 40 | 4 |

Meanwhile, in the next-generation mobile communication, each symbol may be used for downlink or uplink, as shown in the following table. In the following table, uplink is indicated by U, and downlink is indicated by D. In the following table, X indicates a symbol that can be flexibly used for uplink or downlink.

TABLE 5

| for-mat | Symbol Number in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | X | X | U |
| 29 | D | D | D | D | D | D | D | D | D | D | X | X | X | U |
| 30 | D | D | D | D | D | D | D | D | D | X | X | X | X | U |
| 31 | D | D | D | D | D | D | D | D | D | D | X | U | U | U |
| 32 | D | D | D | D | D | D | D | D | D | X | X | U | U | U |
| 33 | D | D | D | D | D | D | D | D | X | X | X | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | D | D | D | D | D | D | D | X |
| 47 | D | D | D | D | X | D | D | D | D | D | D | D | X | X |
| 48 | D | D | X | X | X | X | D | D | X | X | X | X | X | X |
| 49 | D | X | X | X | X | D | X | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |

<Operation Band in NR>

An operation band in NR is as described below. The operation band in Table 6 below is an operation band reframed from the operation band of LTE/LTE-A.

TABLE 6

| NR operation band | UL operation band $F_{UL\_low}$-$F_{UL\_high}$ | DL operation band $F_{UL\_low}$-$F_{UL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The table below represents an NR operation band defined on high frequencies. This is called FR2 band.

TABLE 7

| NR operation band | UL operation band $F_{UL\_low}$-$F_{UL\_high}$ | DL operation band $F_{UL\_low}$-$F_{UL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |

Meanwhile, the operation band of the table above is used, a channel bandwidth is used as represented in the following table.

TABLE 8

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the table above, SCS means a subcarrier spacing. $N_{RB}$ in the table above represents the number of RBs. Meanwhile, when the operation band of the table above is used, a channel bandwidth is used as represented in the following table.

TABLE 9

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

<SS Block in NR>

In the 5G NR, information required for a UE to perform an initial access, that is, a Physical Broadcast Channel (PBCH) including a Master Information Block (MIB) and a synchronization signal (SS) (including PSS and SSS) are defined as an SS block. In addition, a plurality of SS blocks may be grouped and defined as an SS burst, and a plurality of SS bursts may be grouped and defined as an SS burst set. It is assumed that each SS block is beamformed in a particular direction, and various SS blocks existing in an SS burst set are designed to support UEs existing in different directions.

Figure 5:
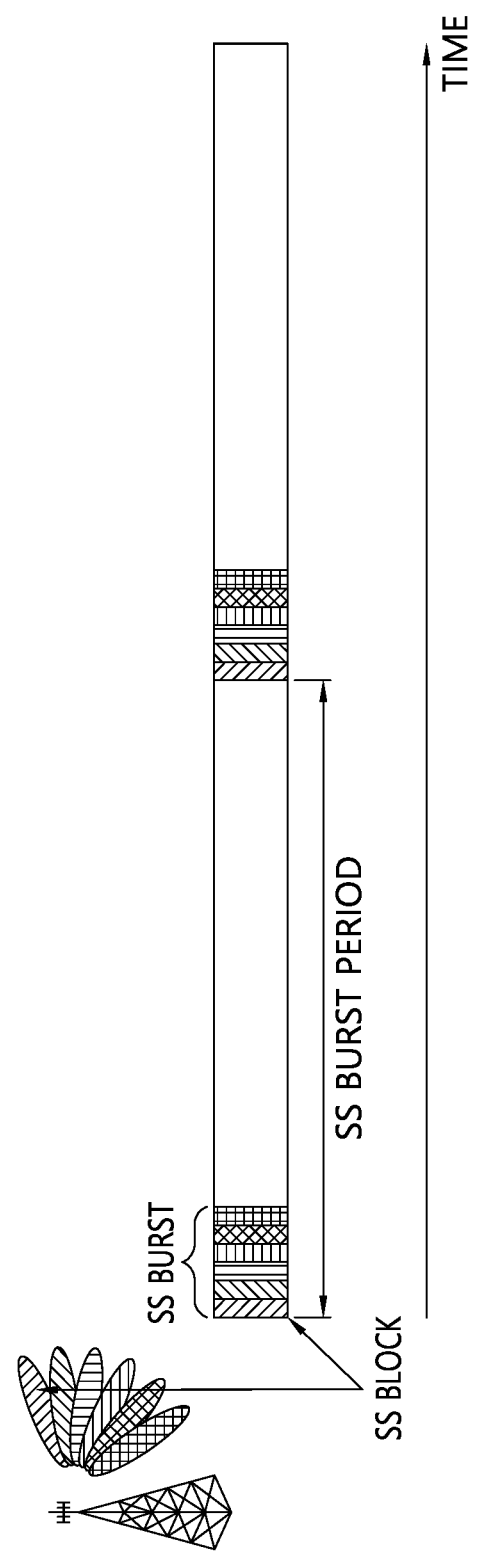
FIG. 5 illustrates an example of a subframe type in NR.

FIG. 5 is a diagram illustrating an example of an SS block in NR.

Referring to FIG. 5, an SS burst is transmitted in every predetermined periodicity. Accordingly, a UE receives SS blocks, and performs cell detection and measurement.

Meanwhile, in the 5G NR, beam sweeping is performed on an SS. A detailed description thereof will be provided with reference to FIG. 6.

Figure 6:
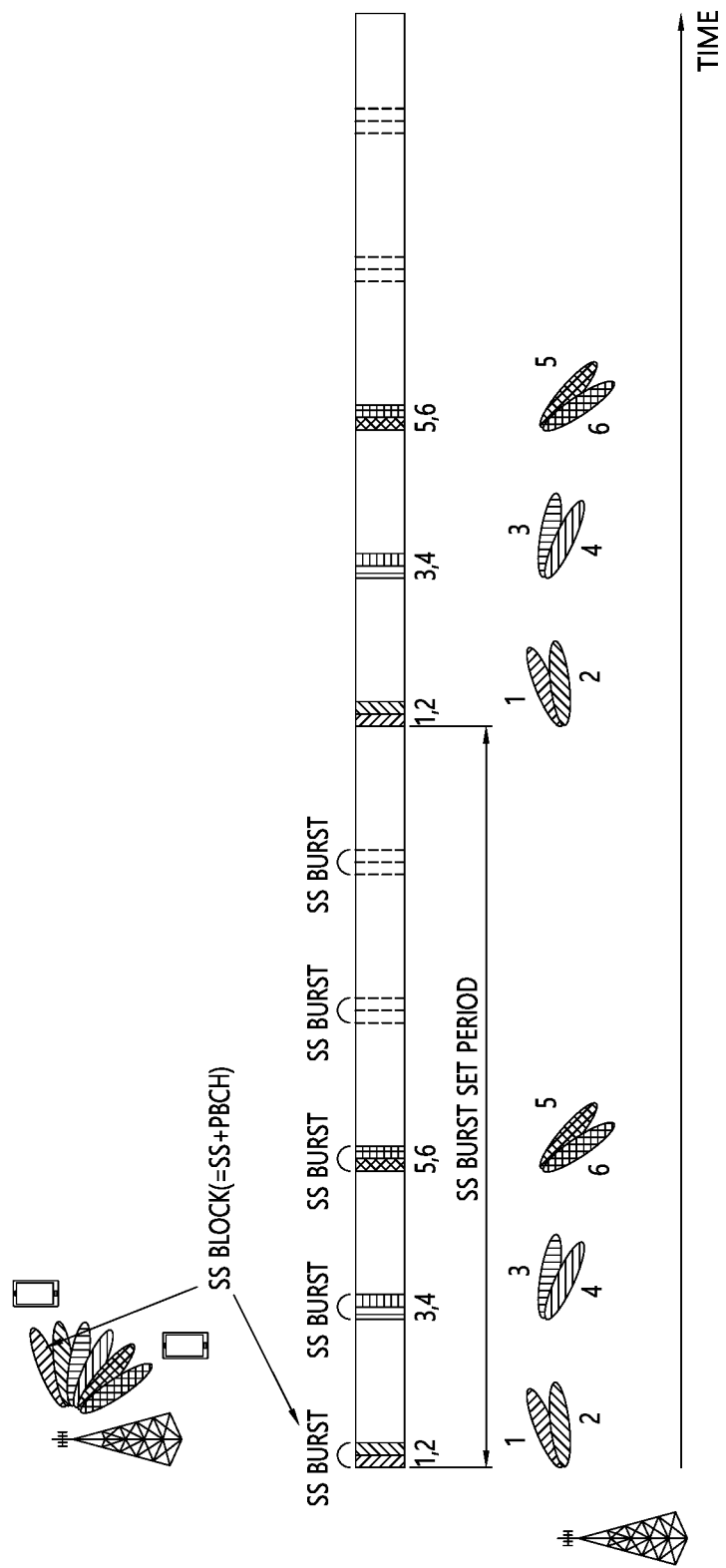
FIG. 6 illustrates an example of an SS block in NR.

FIG. 6 is a diagram illustrating an example of beam sweeping in the NR.

A base station transmits each SS block in an SS burst over time while performing beam sweeping. In this case, multiple SS blocks in an SS burst set are transmitted to support UEs existing in different directions. In FIG. 6, the SS burst set includes one to six SS blocks, and each SS burst includes two SS blocks.

<Out of Band Emission>

Figure 7:
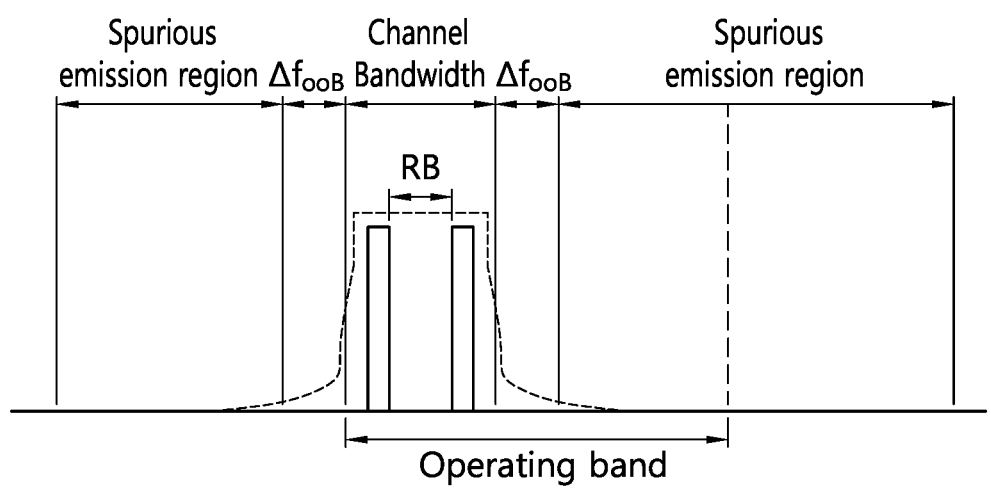
FIG. 7 illustrates the concept of unwanted emission.
Figure 8:
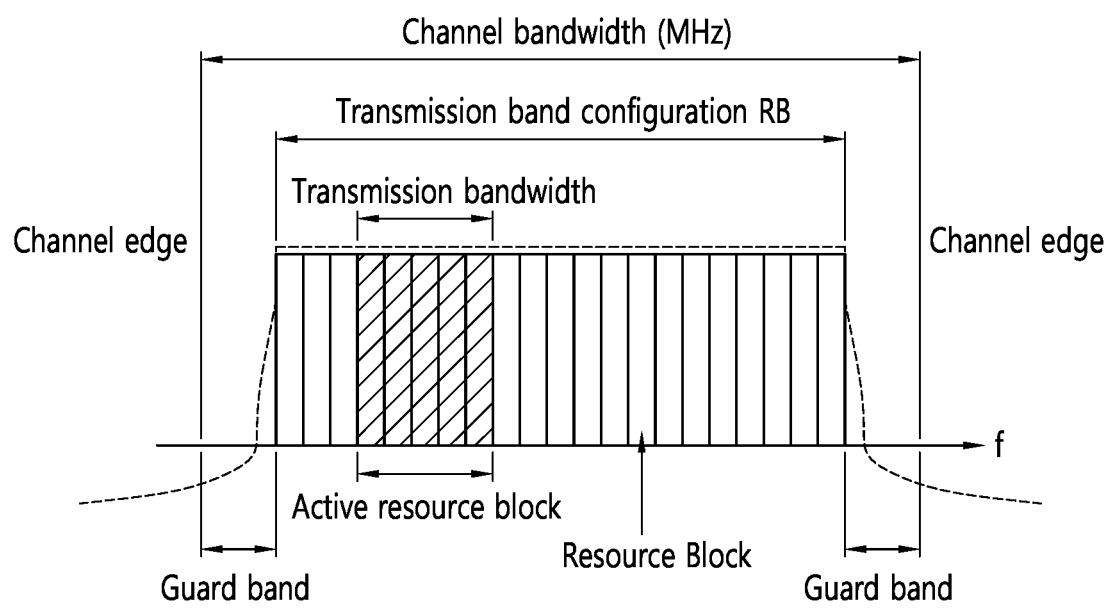
FIG. 8 illustrates a relation between the channel band (MHz) and a resource block (RB) shown in FIG. 7.

FIG. 7 illustrates the concept of an unwanted emission, and FIG. 8 illustrates a relation between the channel band (MHz) and a resource block (RB) shown in FIG. 7.

As seen with reference to FIG. 7, an arbitrary transmission modem transmits a signal on a channel bandwidth which is allocated within an arbitrary E-UTRA band.

Here, a channel bandwidth is defined as seen with reference to FIG. 8. That is, a transmission bandwidth is configured smaller than a channel bandwidth $BW_{Channel}$. A transmission bandwidth configuration is configured by a plurality of resource blocks (RBs). In addition, a channel edge is the uppermost and lowermost frequencies which are divided by a channel bandwidth.

Referring to FIG. 7 again, an unwanted emission occurs in a band of $\Delta f_{OOB}$, and as shown in FIG. 7, an unwanted emission also occurs in a Spurious region. Here, $\Delta f_{OOB}$ means a size of frequency of an Out of Band (OOB). Meanwhile, an emission on the Out of Band is referred to as an emission occurred in a band which is close to an intended transmission band. The Spurious emission is referred to as an emission in which an unwanted emission is emitted even in a frequency band which is far away from an intended transmission band.

Meanwhile, a level of a basic Spurious emission (SE) is defined, which should not be passed to the minimum depending on a frequency range.

As described above so far, when a transmission is performed in an allocated channel band, an unwanted emission occurs in adjacent channels.

As described above, an unwanted emission occurs in adjacent frequency bands which are adjacent with each other by a wireless transmission. In this case, as for an interference due to an emission according to a base station transmission, an interference amount entered to an adjacent band may be reduced below an allowed criterion by an RF filter design of high price and big size, owing to the characteristics of a base station. On the other hand, in the case of a UE, due to a restriction of a UE size, a price restriction of a power amplifier or a transpose duplex filter RF device, or the like, it is hard to prevent an interference from entering an adjacent band.

Accordingly, a restriction of a transmission power of a UE is required.

<Disclosures of the Present Specification>

I. First Disclosure of the Present Specification

Hereinafter, it will be examined whether a UE configured with EN-DC by using B41, which is E-UTRA band, and n41, which is NR band may coexist with another UE that uses an adjacent frequency band.

First, in the case that a UE performs a transmission by using two bands, a harmonic component and an intermodulation distortion (IMD) are generated, which may influence a DL band of the UE itself or a DL band of another UE.

Accordingly, an unwanted emission owing to the IMD in an intra-band EN-DC of band B41 and band n41 is analyzed as below.

TABLE 10

| | B41/n41 intra-band contiguous EN-DC | B41/n41 intra-band non-contiguous EN-DC |
|---|---|---|
| Additional Spurious emission (Network signaling using NS_04) | −25 dBm/MHz | IM3 is flowed into an additional Spectrum Emission Mask (SEM) region |

TABLE 10-continued

|  |  | B41/n41 intra-band contiguous EN-DC | B41/n41 intra-band non-contiguous EN-DC |
|---|---|---|---|
| General Spurious emission (NS_04) | −25 dBm/MHz | IM5 is flowed into a general Spurious emission (SE) region | IM3 is flowed into a general Spurious emission (SE) region |
| A-SEM(NS_04) |  | IM3 is flowed into an additional SEM (A-SEM) region (limited to −13 dBm/MHz) | IM3 is flowed into an additional SEM (A-SEM) region (limited to −25 dBm/MHz) |
| General SEM |  | IM3 is flowed into a general SEM (G-SEM) region (limited to −13 dBm/MHz) | IM3 is flowed into a general SEM (G-SEM) region (−25 dBm/MHz spec limit) |
| EN-DC ACLR |  | IM3 is flowed into ACLR$_{EN\_DC}$ region |  |
| Coexistence between UEs in EN-DC | Received in B40 band | IM3 is flowed into B40 band |  |
|  | Received in B40 band | IM5 is flowed into B30 band | IM3 is flowed into B30 band |
|  | Received in B1/4/66 band | IM7 is flowed into B1/4/66 band | IM5 is flowed into B1/4/66 band |

Generally, in the case that a UE, which is configured with an intra-band EN-DC of band B41 and band n41, receives a network signal (e.g., NS_04), A-MPR may be applied to protect Additional Spectrum Emission Mask (A-SEM), Additional Spurious Emissions (A-SE), General Spurious Emissions (G-SE), and the like. Furthermore, in order to solve a problem due to IMD, A-MPR may be applied.

However, the research to protect band 40, band 30, band 1, band 4, band 66, and the like has not been progressed. Therefore, hereinafter, considering a transmission (Tx) filter property that uses band B41 and band n41, methods for protecting an adjacent reception band are being researched.

TABLE 11

| Property | Min For T$_{SPEC}$ | Typ. at +25° C. | Max For T$_{SPEC}$ |  |
|---|---|---|---|---|
| 1850 ... 1915 MHz | 9 | 13 | — | dB |
| 1880 ... 1920 MHz | 8 | 12 | — | dB |
| 1920 ... 1980 MHz | 6 | 9 | — | dB |
| 2110 ... 2170 MHz | 3 | 5 | — | dB |
| 2300 ... 2400 MHz | 5 | 8 | — | dB |
| 2750 ... 2850 MHz | 11 | 14 | — | dB |
| 2850 ... 3000 MHz | 11 | 14 | — | dB |
| 3000 ... 3400 MHz | 6 | 9 | — | dB |
| 3400 ... 3600 MHz | 13 | 15 | — | dB |
| 3600 ... 3800 MHz | 16 | 18 | — | dB |
| 4990 ... 5950 MHz | 25 | 35 | — | dB |
| 4992 ... 5380 MHz | 32 | 37 | — | dB |
| 7488 ... 7990 MHz | 6 | 9 | — | dB |
| WiFi ch8  2438 ... 2456 MHz | 32 | 35 | — | dB |
| WiFi ch9  2443 ... 2461 MHz | 30 | 33 | — | dB |
| WiFi ch10 2448 ... 2466 MHz | 30 | 33 | — | dB |
| WiFi ch11 2453 ... 2471 MHz | 17 | 33 | — | dB |
| WiFi ch12 2458 ... 2476 MHz | 9 | 22 | — | dB |
| WiFi ch13 2463 ... 2481 MHz | 6 | 12 | — | dB |

As seen from the table above, in order to protect band 30 and band 40 from an interference due to band 41, an attenuation of 5 dB may be considered. As seen from the table below, an average attenuation level may be derived from all candidates of transmission (Tx) filters for band 41.

The average attenuation level may be anticipated as 10 dB as represented in the table below.

The table below represents all candidates of the transmission (Tx) filter for band 41.

TABLE 12

| Transmission (Tx) filter using band B41 | Transmission filter attenuation of band B41 (at 2300-2400 MHz) Perform a reception (Rx) using band B40 and band B30 |
|---|---|
| A | 5 dB |
| B | 3 dB |
| C | 20 dB |
| D | 12 dB |
| Average | 10 dB |

The properties of filters may be arranged as below.

Arrangement 1: In order to protect band B30 and band B40 from an interference due to band 41, an average attenuation level of 10 dB may be considered.

I-1. MSD Analysis for Intra-Band Contiguous EN-DC of Band B41 and Band n41

Hereinafter, an influence of IMD by intra-band EN-DC of band B41 and band n41 exerted on an adjacent reception band is analyzed.

Figure 9:
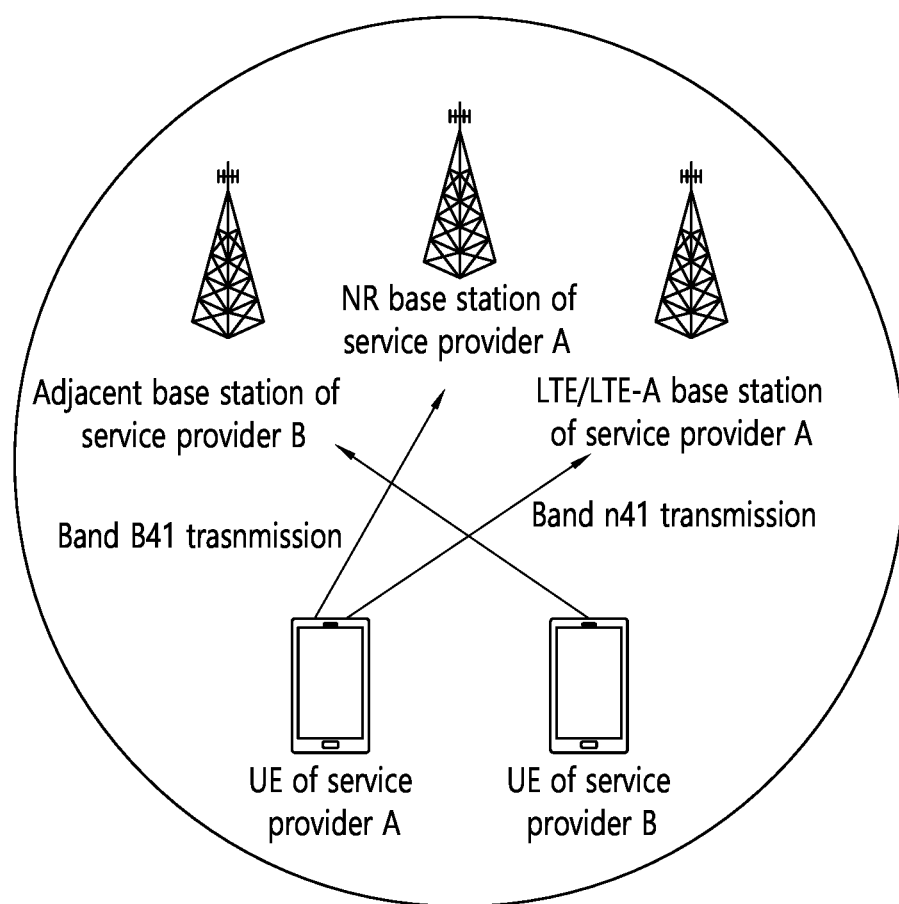
FIG. 9 illustrates an example in which a UE configured with intra-band contiguous EN-DC of band B41 and band n41 and a UE using an adjacent band coexist.

FIG. 9 illustrates an example that a UE configured with intra-band contiguous EN-DC of band B41 and band n41 and a UE using an adjacent band coexist.

FIG. 9 shows an example that service provider A and service provider B provide services in a specific area at the same time.

In this situation, a base station of service provider A, LTE/LTE-A based base station, and an NR base station of service provider B transmit a Master Information Block (MIB) and a System Information Block (SIB), respectively.

The System Information Block (SIB) may include at least one of information for an operation band used by a base station itself among the operation bands represented in Table 1, Table 6, and Table 7, information for Uplink (UL) bandwidth and information for UL carrier frequency.

At this time, intra-band EN-DC of band B41 and band n41 may be configured to a UE of service provider B.

In this case, IMD may be occurred by intra-band EN-DC of band B41 and band n41, and the IMD may cause an interference on the UE of service provider B that uses an adjacent band.

Hereinafter, in order to solve the influence on the adjacent reception band by the IMD, a required A-MPR value is analyzed as below.

Figure 10A:
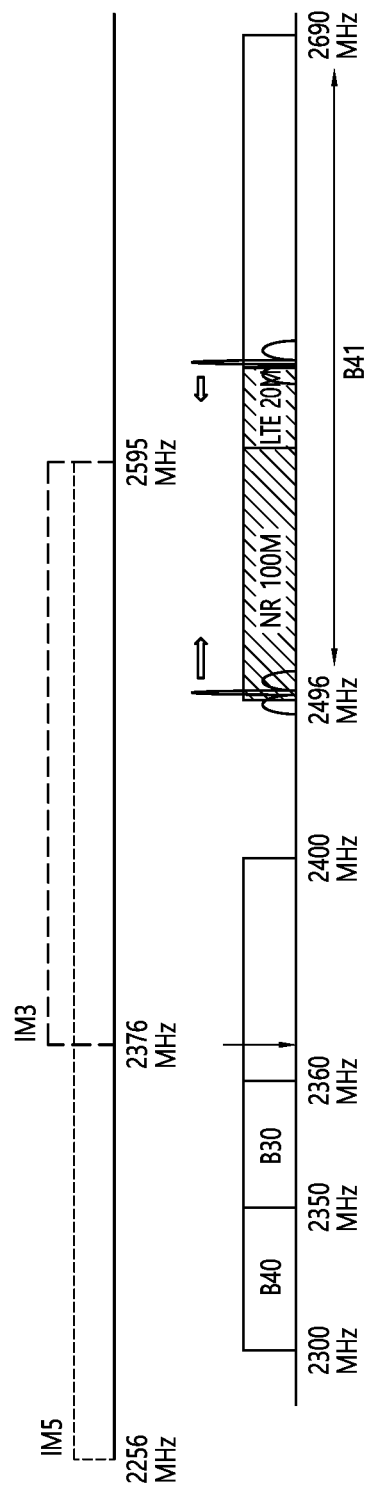
FIG. 10a is an exemplary diagram illustrating an IMD problem in intra-band contiguous EN-DC of band B41 and band n41.

FIG. 10a is an exemplary diagram illustrating IMD problem in intra-band contiguous EN-DC of band B41 and band n41, and FIG. 10b is an exemplary diagram illustrating an experiment result.

As shown in FIG. 10a, the third IMD component (i.e., IMD3) influences band B40. In addition, the fifth IMD component (i.e., IMD3) influences both of band B30 and band B40.

Since the general MPR is not defined considering such an EN-DC situation, the A-MPR using a network signaling may need to be used. That is, in order for a UE configured with intra-band EN-DC of band B41 and band n41 to coexist with another UE that uses an adjacent frequency band, the A-MPR using a network signaling (e.g., NS_04) may be applied.

Proposal 1: In order for a UE, which is configured with intra-band EN-DC, to coexist with another UE that uses an adjacent frequency band, a relevant network signaling may be used.

Therefore, this may be arranged as below.

Arrangement 2: In North America, the coexistence problem between band 41 and band 40 does not occur. However, in China, in order to protect band 40, the UE to UE Coexistence Requirement needs to be newly defined or modified.

Based on the arrangements above, the present disclosure may be proposed as below.

Proposal 2: It does not seem to be required to protect band 40 from band 41 or protect band 40 from the EN-DC of band B41 and band n41. Accordingly, in the protection band list to which the UE to UE Coexistence Requirement is applied, band B1, band B40, NR band n77, NR band n78, and NR band n79 may be removed.

Based on the description above, the UE to UE Coexistence Requirement in the intra-band EN-DC may be modified or improved as represented in the following Table.

TABLE 13

| EN-DC configuration | Guard band | Spurious emission (SE) | | | |
|---|---|---|---|---|---|
| | | Frequency range (MHz) | Maximum level (dBm) | MBW (MHz) | Note |
| DC_(n)71B | E-UTRA band 4, 5, 13, 14, 17, 24, 26, 30, 48, 66 | $F_{UL\_low}$-$F_{UL\_high}$ | −50 | 1 | |
| | E-UTRA band 2, 25, 41, 70 | $F_{UL\_low}$-$F_{UL\_high}$ | −50 | 1 | 2 |
| | E-UTRA band 29 | $F_{UL\_low}$-$F_{UL\_high}$ | −38 | 1 | 3, 4 |
| | E-UTRA band 12, 71 | $F_{UL\_low}$-$F_{UL\_high}$ | −50 | 1 | 3, 4 |
| DC_(n)41AA | E-UTRA band 2, 3, 5, 8, 10, 12, 13, 14, 17, 24, 25, 26, 27, 28, 29, 34, 39, 42, 44, 45, 48, 50, 51, 70, 71, 73, 74 | $F_{UL\_low}$-$F_{UL\_high}$ | −50 | 1 | |
| | E-UTRA band 4, 30, 66 | $F_{UL\_low}$-$F_{UL\_high}$ | −50 | 1 | 7 |
| | E-UTRA band 1, 40, NR Band n77, n78 and n79 | $F_{UL\_low}$-$F_{UL\_high}$ | TBD | 1 | |
| | E-UTRA band 9, 11, 18, 19, 21 | $F_{UL\_low}$-$F_{UL\_high}$ | −50 | 1 | 6 |
| | Frequency range | 1884.5-1915.7 | −41 | 0.3 | 5, 6 |

Note 1:
$F_{UL\_low}$-$F_{UL\_high}$ means an E-UTRA frequency band.
Note 2:
Due to the second, the third, the fourth or the fifth harmonics Spurious emissions, a measurement is exceptionally allowed in each E-UTRA carrier. Due to spreading of the harmonic emission, edge 1 MHz frequency band of the both sides of the harmonic emission may be exceptionally allowed.

The A-MPR using a network signaling (e.g., NS_04) to protect band B40 and band 30 from an IMD component may be as shown in FIG. 10b.

As shown in FIG. 10b, in order to protect band B40 according to a UE to UE Coexistence Requirement, that is, based on −50 dBm/MHz, a transmission power should be lowered as much as 19 dB. Therefore, based on the UE to UE Coexistence Requirement of −50 dBm/MHz, band B40 cannot be protected through a value of the A-MPR.

That is, in an intra-band contiguous EN-DC of band B41 and band n41, the requirement previously defined to protect an adjacent frequency band B40, that is, −50 dBm/MHz cannot be fulfilled. Accordingly, a disclosure of the present specification proposes to relax the UE to UE Coexistence Requirement from −50 dBm/MHz to −40 dBm/MHz.

Since band 40 is not used in North America, there is no coexistence problem between band 41 and band 40 in North America. However, in China, there is a possibility that band 41 and band 40 are used in a near future.

This makes the entire exceptional spacings focused on the harmonic emission (of 2 MHz+N×$L_{CRB}$×180 kHz). Here, N may be 2, 3, 4 and 5 for the second, the third, the fourth and the fifth harmonics, respectively. In the case that a maximum bandwidth (MBW) is entirely or partially overlapped with the entire exceptional spacing, the exception may be applied.

Note 3: The requirements may be applied for the frequency ranges which are less than $F_{OOB}$ from the edge of the channel bandwidth.

Note 4: In the case that network signaling NS_35 is provided, the requirement may be applied.

Note 5: This may be applied for the coexistence with a PHS system operating in the frequency range 1884.5-1915.7 MHz.

Note 6: This requirement may be applied to the case that NR carrier exists in the frequency range 2545-2575 MHz or the frequency range 2595-2645 MHz, and a channel bandwidth exists in 10 MHz or 20 MHz.

Note 7: In the case that network signaling NS_04 is provided, the requirement may be applied.

I-2. MSD Analysis for Intra-Band Non-Contiguous EN-DC of Band B41 and Band n41

In order to check the IMD problem to an adjacent reception band in Table 9, considering the UE to UE Coexistence Requirement for intra-band non-contiguous EN-DC of band B41 and band n41, that is, −50 dBm/MHz, a value of the A-MPR for protecting reception bands influenced by the third IMD and the fifth IMD components is analyzed.

Figure 11A:
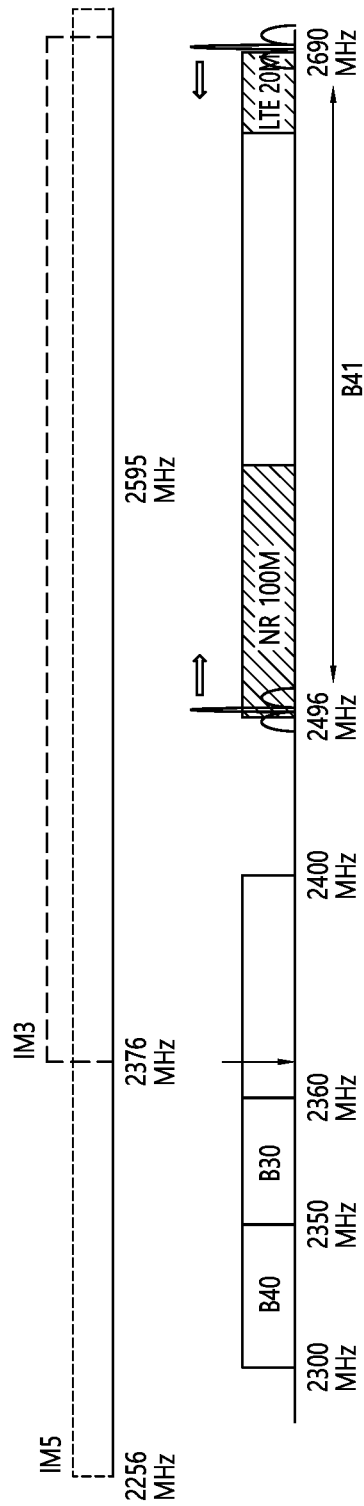
FIG. 11a is an exemplary diagram illustrating an IMD problem in intra-band non-contiguous EN-DC of band B41 and band n41.

FIG. 11a is an exemplary diagram illustrating IMD problem in intra-band non-contiguous EN-DC of band B41 and band n41, and FIG. 11b is an exemplary diagram illustrating an experiment result.

As shown in FIG. 11a, the third IMD component (i.e., IMD3) influences both of band B40 and band B30. In addition, the fifth IMD component (i.e., IMD3) influences both of band B1/B4 and band B66. From the analysis, a network signaling (e.g., NS_04) may be considered for the UE to UE Coexistence Requirement for intra-band EN-DC of band B41 and band n41.

In order to protect band B40 and band 30 from the third IMD component, the A-MPR value using the network signaling (e.g., NS_04) may be as shown in FIG. 11b.

The UE to UE Coexistence Requirement for intra-band non-contiguous EN-DC of band B41 and band n41 (i.e., −50 dBm/MHz) may be fulfilled by the A-MPR for protecting an adjacent band.

In order to protect band B40 and band 30, the A-MPR may be 19 dB in the worst case in FIG. 11b, which is similar to the contiguous EN-DC case.

Accordingly, even in the case that the A-MPR using a network signaling is applied for the intra-band non-contiguous EN-DC of band B41 and band n41, the adjacent band B40 may not be protected with the UE to UE Coexistence Requirement of −50 dBm/MHz.

Therefore, considering an average attenuation level of a transmission filter performance for band 41, in order to protect band 40 and band 30 from the third IMD component, it is required to relax the UE to UE Coexistence Requirement.

That is, in order to protect adjacent LTE band 30, the UE to UE Coexistence Requirement may be reduced to −40 dBm/MHz.

Based on the description, the following is proposed.

Proposal 3: In order to protect a UE using adjacent frequency band 30 from a UE, which is configured with intra-band non-contiguous EN-DC of band B41 and band n41, the UE to UE Coexistence Requirement may be reduced to −40 dBm/MHz.

TABLE 14

| EN-DC configuration | Guard band | Spurious emission (SE) | | | |
|---|---|---|---|---|---|
| | | Frequency range (MHz) | Maximum level (dBm) | Maximum bandwidth (MBW)(MHz) | Note |
| DC_41A_n41A | E-UTRA band 2, 3, 5, 8, 10, 12, 13, 14, 17, 24, 25, 26, 27, 28, 29, 34, 39, 42, 44, 45, 48, 50, 51, 70, 71, 73, 74 | $F_{UL\_low}$-$F_{UL\_high}$ | −50 | 1 | |
| | E-UTRA band 4, 66 | $F_{UL\_low}$-$F_{UL\_high}$ | −50 | 1 | 3 |
| | E-UTRA band 9, 11, 18, 19, 21 | $F_{UL\_low}$-$F_{UL\_high}$ | −50 | 1 | 5 |
| | E-UTRA band 30 | $F_{UL\_low}$-$F_{UL\_high}$ | −40 | 1 | 3 |
| | Frequency range | 1884.5-1915.7 | −41 | 0.3 | 4, 5 |

Note 1:
$F_{DL\_low}$-$F_{DL\_high}$ means an E-UTRA frequency band.
Note 2:
Due to the second, the third, the fourth or the fifth harmonics Spurious emissions, a measurement is exceptionally allowed in each E-UTRA carrier. Due to spreading of the harmonic emission, edge 1 MHz frequency band of the both sides of the harmonic emission may be exceptionally allowed.

This makes the entire exceptional spacings are focused to the harmonic emission (of 2 MHz+N×$L_{CRB}$×180 kHz). Here, N may be 2, 3, 4 and 5 for the second, the third, the fourth, and the fifth harmonics, respectively. In the case that a maximum bandwidth (MBW) is entirely or partially overlapped with the entire exceptional spacing, the exception may be applied.

Note 3: In the case that network signaling NS_04 is provided, the requirement may be applied.

Note 4: This requirement may be applied for the coexistence with a PHS system operating in the frequency range 1884.5-1915.7 MHz.

Note 5: This requirement may be applied to the case that NR carrier exists in the frequency range 2545-2575 MHz or the frequency range 2595-2645 MHz, and a channel bandwidth exists in 10 MHz or 20 MHz.

I-3. Influence of A-MPR by a Filter in Band 41

In determining the A-MPR for intra-band non-contiguous EN-DC of band B41 and band n41, a transmission (Tx) filter property using band 41 is still not reflected.

Accordingly, a transmission (Tx) filter attenuation performance depending on a frequency range is arranged as below.

TABLE 15

| | Range (MHz) | | | | | | | | | |
|---|---|---|---|---|---|---|---|---|---|---|
| | 1805-1995 B2/B3/25 Reception | 2010-2025 B34 Reception | 2110-2200 B1/4/66 Reception | 2300-2400 B40/B30 Reception | 2400-2471 | 2480 | 2490.5 | Band 41 In-band 2496-2690 | 2720-2735 | 2750-2850 |
| B41 transmission filter attenuation | | 6 dB min | | 4 dB min | 3 dB min | 5 dB min | 17 dB min | 6 dB min | Fairly flat (0 dB) | 11 dB min |
| IMD Source | IM3 IM5 IM7 | | | | | | IM7 | IM3 IM5 | | |

From the table above, a minimum attenuation level in 2480 MHz is identified as about 6 dB. In this range, it is very difficult to attenuate 15 dB or more. However, in a low frequency range of 2480 MHz, a proper filter attenuation level may be guaranteed. In the Table above, it may not be realistic that a proper filter attenuation level may be guaranteed from 2470 MHz.

Therefore, for the A-MPR of intra-band non-contiguous EN-DC of band B41 and band n41, $F_{filter,low}$ may be changed by considering the transmission (Tx) filter property.

I-3-1. A-MPR using NS_04 Signaling

In the case that intra-band non-contiguous EN-DC of band B41 and band n41 is set to a UE, and the UE receives a network signaling (e.g., NS_04), the UE may determine an allowable maximum output power reduction as below.

The UE may determine a channel configuration case and a value of A-MPR$_{IM3}$ as below.

If AND ($F_{IM3,low\_block,high} < F_{filter,low}$, MAX(SEM$_{-13,high}$, $F_{IM3,high\_block,low}) > F_{filter,high}$), A-MPR$_{IM3}$ corresponds to channel configuration case C, Else, A-MPR$_{IM3}$ corresponds to channel configuration case D, Herein, each item is as described below.

$$F_{IM3,low\_block,high} = (2*F_{low\_channel,high\_edge}) - F_{high\_channel,low\_edge}$$

$$F_{IM3,high\_block,low} = (2*F_{high\_channel,low\_edge}) - F_{low\_channel,high\_edge}$$

$F_{low\_channel,low\_edge}$ means the lowermost frequency in a low transmission band configuration.

$F_{low\_channel,high\_edge}$ means the uppermost frequency in a low transmission band configuration.

$F_{high\_channel,low\_edge}$ means the lowermost frequency in a high transmission band configuration.

$F_{high\_channel,high\_edge}$ means the uppermost frequency in a high transmission band configuration.

$F_{filter,low}$=2480 MHz is changed to $F_{filter,low}$=2470 MHz. $F_{filter,high}$=2750 MHz Proposal 4: In order to guarantee the reasonable filter attenuation level based on a transmission filter property of band 41, $F_{filter,low}$ should be started at 2470 MHz.

I-4. Arrangement of the First Disclosure

As described above, in the situation in which the intra-band EN-DC of band B41 and band n41 is used, considering the A-MPR due to a network signaling and the transmission filter property in band 41, the UE to UE Coexistence Requirement has been examined This is arranged as below.

Arrangement 1: In order to protect band B30 and band B40 from an interference due to band 41, an average attenuation level of 10 dB may be considered.

Arrangement 2: In North America, the coexistence problem between band 41 and band 40 does not occur. However, in China, in order to protect band 40, the UE to UE Coexistence Requirement needs to be newly defined or modified.

Proposal 1: In order for a UE to which intra-band EN-DC is set to coexist with another UE that uses an adjacent frequency band, a proper network signaling may be used.

Proposal 2: It does not seem to be required to protect band 40 from band 41 or protect band 40 from the EN-DC of band B41 and band n41. Accordingly, in the protection band list to which the UE to UE Coexistence Requirement is applied, band B1, band B40, NR band n77, NR band n78 and NR band n79 may be removed.

Proposal 3: In order to protect a UE using adjacent frequency band 30 from a UE to which intra-band non-contiguous EN-DC of band B41 and band n41 is set, the UE to UE Coexistence Requirement may be reduced to −40 dBm/MHz.

Proposal 4: In order to guarantee the reasonable filter attenuation level based on a transmission filter property of band 41, $F_{filter,low}$ should be started at 2470 MHz.

II. Second Disclosure of the Present Specification

II-1. A-MPR in Band B71 and Band n71

In a DC of band 71 and band n71, an A-MPR through a network signaling is as described below.

(1) In the case that a UE transmits capability information, which includes information that a dynamic power sharing is supported, to a network, a value of A-MPR may be determined as below.

$$A\text{-}MPR_{DC} = CEIL\{M_{A,DC}(A), 0.5\} \qquad [\text{Equation 1}]$$

Herein, A-MPR$_{DC}$ is a value of the total allowed maximum power reduction (dB).

| For OFDM | | |
|---|---|---|
| $M_{A,DC} =$ | 10.00−11.67*A; | 0.00 < A ≤ 0.30 |
| | 7.10−2.00*A; | 0.30 < A ≤ 0.80 |
| | 5.50; | 0.80 < A ≤ 1.00 |
| For DFT-S-OFDM | | |
| $M_{A,DC} =$ | 10.00−13.33*A; | 0.00 < A ≤ 0.30 |
| | 7.00−3.33*A; | 0.30 < A ≤ 0.60 |
| | 5.00; | 0.60 < A ≤ 1.00 |

Herein, A = ($L_{CRB, LTE}$ + $L_{CRB, NR}$)/($N_{RB, TLE}$ + $N_{RB, NR}$).

$L_{CRB}$ and $N_{RB}$ represent the number of allowed PRBs and the number of PRBs of a transmission bandwidth for each CG.

(2) In the case that a UE transmits capability information transmitted to a network with information that a dynamic power sharing is not supported, a value of A-MPR may be determined as below.

$$AMPR_{LTE} = \text{CEIL } \{M_{A,LTE}(A), 0.5\}$$

$$AMPR_{NR} = \text{CEIL } \{M_{A,NR}(A), 0.5\} \quad \text{[Equation 2]}$$

Herein, the A-MPR is a value of the total power reduction allowed for each CG.

$$M_{A,LTE} = M_{A,DC}(A_{LTE,wc}) - \Delta_{LTE}$$

$$M_{A,NR} = M_{A,DC}(A_{NR,wc}) - \Delta_{NR}$$

$$A_{LTE,wc} = \frac{L_{CRB,LTE} + 1}{N_{RB,LTE} + \tilde{N}_{RB,NR}}$$

$$A_{NR,wc} = \frac{1 + L_{CRB,NR}}{N_{RB,LTE} + N_{RB,NR}}$$

$$\Delta_{LTE} = 10 \log_{10} \frac{L_{CRB,LTE}}{L_{CRB,LTE} + \tilde{N}_{RB,NR}}$$

$$\Delta_{NR} = 10 \log_{10} \frac{L_{CBR,NR}}{N_{RB,LTE} + L_{CRB,NR}}$$

Herein, $\tilde{N}_{RB,NR}$ indicates a transmission bandwidth configuration of an SCG channel for SCS=15 kHz.

II-2. A-MPR using a Network Signal (e.g., NS_04)

In the case that an intra-band contiguous EN-DC of band B41 and band n41 is set to a UE, and the UE receives a network signal, for example, NS_04, the UE may determine a total allowed maximum output power reduction as below.

The UE may determine a channel configuration case and a value of A-MPR$_{IM3}$ as below.

If $F_{IM3,low\_block,low} < 2490.5$ MHz, A-MPR$_{IM3}$ for channel configuration case A may be used.

Else, A-MPR$_{IM3}$ for channel configuration case B may be used.

Herein, each item is as described below.

$$F_{IM3,low\_block,low} = (2*F_{low\_channel,low\_edge}) - F_{high\_channel,high\_edge}$$

$F_{low\_channel,low\_edge}$ means the lowermost frequency in a low transmission band configuration.

$F_{high\_channel,high\_edge}$ means the uppermost frequency in a high transmission band configuration.

The UE determines the total allowed maximum output power reduction as described below.

In the case that a dynamic power sharing is not supported, and a power back-off is independently applied $$\text{A-MPR}_{LTE} = \text{MAX}(\text{A-MPR}_{single,LTE}, \text{A-MPR}_{IM3})$$

$$\text{A-MPR}_{NR} = \text{MAX}(\text{A-MPR}_{single,NR}, \text{A-MPR}_{IM3})$$

In the case that a dynamic power sharing is supported, and a power back-off is uniformly applied between LTE and NR $$\text{A-MPR} = \text{MAX}(\text{A-MPR}_{single,LTE}, \text{A-MPR}_{single,NR}, \text{A-MPR}_{IM3})$$

A-MPR$_{single,LTE}$ is a value of A-MPR defined for an LTE transmission.

A-MPR$_{single,NR}$ is a value of A-MPR defined for an NR transmission.

II-3. A-MPR$_{IM3}$ using a Network Signal (e.g., NS_04) to Fulfill −13 dBm/1 MHz In the case that channel configuration case A or channel configuration case C is configured, a maximum output reduction allowed for IM3 for a transmission performed in MCG and SCG to which non-contiguous resource is allocated is as described below.

In the case that a UE transmits capability information (e.g., UE-MRDC-Capability), which includes information that a dynamic power sharing is supported, to a network, a value of A-MPR may be determined as below.

$$AMPR_{DC} = \text{CEIL } \{M_{A,DC}(A), 0.5\} \quad \text{[Equation 3]}$$

Herein, $M_{A,DC}$ is defined as below.

| $M_{A,DC} =$ | 14; | $0 \leq A < 0.01$ |
|---|---|---|
| | 9; | $0.01 \leq A < 0.02$ |
| | 7; | $0.02 \leq A < 0.03$ |
| | 5; | $0.03 \leq A \leq 1.0$ |

In the case that a UE supports a dynamic power sharing $$A = (L_{CRB\_LTE}*12*SCS_{LTE} + L_{CRB\_NR}*12*SCS_{NR})/(N_{RB\_LTE}*12*SCS_{LTE} + N_{RB\_NR}*12*SCS_{NR})$$

In the case that a UE does not support a dynamic power sharing, and in LTE $$A = (L_{CRB\_LTE}*12*SCS_{LTE} + 12*SCS_{NR})/(N_{RB\_LTE}*12*SCS_{LTE} + N_{RB\_NR}*12*SCS_{NR})$$

In the case that a UE does not support a dynamic power sharing, and in NR $$A = (12*SCS_{LTE} + L_{CRB\_NR}*12*SCS_{NR})/(N_{RB\_LTE}*12*SCS_{LTE} + N_{RB\_NR}*12*SCS_{NR})$$

II-4. A-MPR using a Network Signal (e.g., NS_04) to Fulfill −25 dBm/1 MHz

In the case that channel configuration case B or channel configuration case D is set, a maximum output reduction allowed for IM3 for a transmission performed in MCG and SCG to which non-contiguous resource is allocated is as described below.

In the case that a UE transmits capability information (e.g., UE-MRDC-Capability), which includes information that a dynamic power sharing is supported, to a network, a value of A-MPR may be determined as below.

$$AMPR_{DC} = \text{CEIL } \{M_{A,DC}(A), 0.5\} \quad \text{[Equation 4]}$$

Herein, $M_{A,DC}$ is defined as below.

| $M_{A,DC} =$ | 14; | $0 \leq A < 0.02$ |
|---|---|---|
| | 13; | $0.02 \leq A < 0.03$ |
| | 12; | $0.03 \leq A < 0.09$ |
| | 11; | $0.09 \leq A \leq 1.0$ |

In the case that a UE supports a dynamic power sharing $$A = (L_{CRB\_LTE}*12*SCS_{LTE} + L_{CRB\_NR}*12*SCS_{NR})/(N_{RB\_LTE}*12*SCS_{LTE} + N_{RB\_NR}*12*SCS_{NR})$$

In the case that a UE does not support a dynamic power sharing, and in LTE $$A = (L_{CRB\_LTE}*12*SCS_{LTE} + 12*SCS_{NR})/(N_{RB\_LTE}*12*SCS_{LTE} + N_{RB\_NR}*12*SCS_{NR})$$

In the case that a UE does not support a dynamic power sharing, and in NR $$A = (12*SCS_{LTE} + L_{CRB\_NR}*12*SCS_{NR})/(N_{RB\_LTE}*12*SCS_{LTE} + N_{RB\_NR}*12*SCS_{NR})$$

II-5. Arrangement of the Second Disclosure (Intra-Band Non-Contigous EN-DC)

In a combination of intra-band EN-DC bands to which an additional requirement is applied, the A-MPR according to a combination of network signaling received from an E-UTRA cell and an NR cell may be arranged as described below.

II-5-1. A-MPR using a Network Signal (e.g., NS_04)

In the case that an intra-band contiguous EN-DC of band B41 and band n41 is set to a UE, and the UE receives a network signal, for example, NS_04, the UE may determine a total allowed maximum output power reduction as below.

The UE may determine a channel configuration case and a value of A-MPR$_{IM3}$ as below.

In the case that AND ($F_{IM3,low\_block,high}$<$F_{filter,low}$, MAX (SEM$_{-13,high}$, $F_{IM3,high\_block,low}$)>$F_{filter,high}$)

A-MPR$_{IM3}$ for channel configuration case C may be used.
A-MPR$_{IM3}$ for channel configuration case D may be used.
Here, each item is as described below.

$$F_{IM3,low\_block,high}=(2*F_{low\_channel,high\_edge})-F_{high\_channel,low\_edge}$$

$$F_{IM3,high\_block,low}=(2*F_{high\_channel,low\_edge})-F_{low\_channel,high\_edge}$$

$F_{low\_channel,low\_edge}$ means the lowermost frequency in a low transmission band configuration.

$F_{low\_channel,high\_edge}$ means the uppermost frequency in a low transmission band configuration.

$F_{high\_channel,low\_edge}$ means the lowermost frequency in a high transmission band configuration.

$F_{high\_channel,high\_edge}$ means the uppermost frequency in a high transmission band configuration.

$$F_{filter,low}=2470 \text{ MHz}$$

$$F_{filter,high}=2750 \text{ MHz}$$

SEM$_{-13,high}$=represents a threshold frequency, in the case that a spectral emission mask (SEM) for a higher channel is reduced from −13 dBm/1 MHz to −25 dBm/1 MHz.

A UE determines a value of A-MPR$_{ACLRoverlap}$ as below.
If $W_{gap}$<$BW_{channel,LTE}$+$BW_{channel,NR}$, A-MPR$_{ACLRoverlap}$=4 dB
Else, A-MPR$_{ACLRoverlap}$=0 dB
Herein, $W_{gap}$=$F_{high\_channel,low\_edge}$−$F_{low\_channel,high\_edge}$ The UE determines the total allowed maximum output power reduction as described below.

In the case that a dynamic power sharing is not supported, and a power back-off is independently applied $$A\text{-}MPR_{LTE}=MAX(A\text{-}MPR_{single,LTE}, A\text{-}MPR_{IM3}, A\text{-}MPR_{ACLRoverlap})$$

$$A\text{-}MPR_{NR}=MAX(A\text{-}MPR_{single,NR}, A\text{-}MPR_{IM3}, A\text{-}MPR_{ACLRoverlap})$$

In the case that a dynamic power sharing is supported, and a power back-off is uniformly applied between LTE and NR $$A\text{-}MPR=MAX(A\text{-}MPR_{single,LTE}, A\text{-}MPR_{single,NR}, A\text{-}MPR_{IM3}, A\text{-}MPR_{ACLRoverlap})$$

A-MPR$_{single,LTE}$ is a value of A-MPR defined for an LTE transmission.

A-MPR$_{single,NR}$ is a value of A-MPR defined for an NR transmission.

III. Method According to Disclosures of the Present Specification

Figure 12:
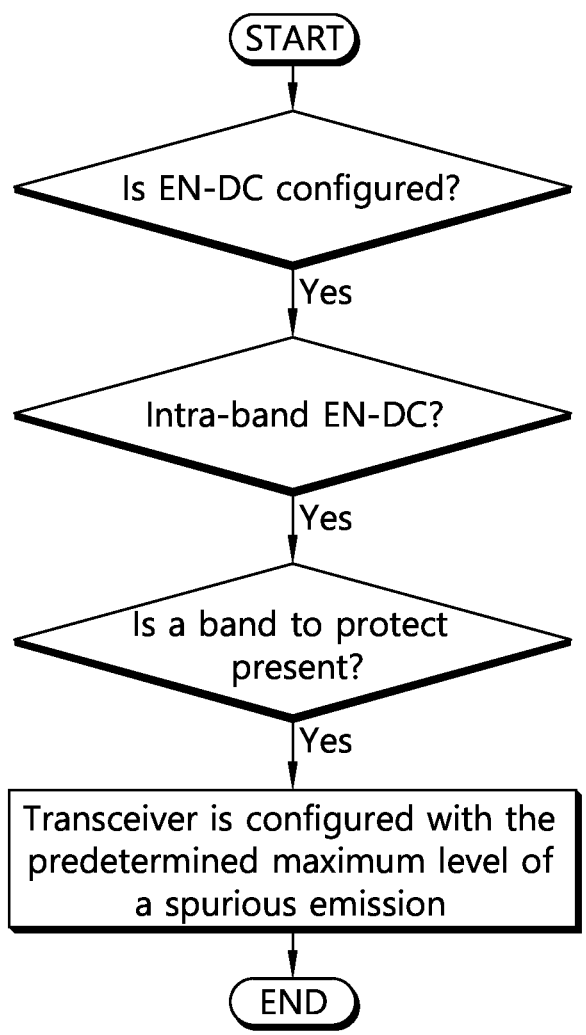
FIG. 12 is a flowchart illustrating a method according to disclosures of the present specification.

FIG. 12 is a flowchart illustrating a method according to disclosures of the present specification.

According to the disclosures of the present specification, a method for controlling a transceiver is provided.

First, a UE checks whether a Dual Connectivity (DC) of Evolved Universal Terrestrial Radio Access (E-UTRA) and New Radio (NR) is configured.

In the case that the DC of E-UTRA and NR is configured, the UE identifies whether the DC of EN is an intra-band non-contiguous DC.

Then, the UE checks whether a band to protect is present.

Based on (i) the E-UTRA including at least E-UTRA operation band 41, (ii) the NR including at least NR operation band 41, and (iii) the fact that the band to be protected corresponds to a first band, the UE may control the transceiver to fulfill a predetermined maximum level of a spurious emission.

The first band may be E-UTRA operation band 30.

The DC may be an intra-band DC.

The DC may be an intra-band non-contiguous DC.

The predetermined maximum level of a spurious emission may be −40 dBm.

The predetermined maximum level of a spurious emission may be applied based on a minimum bandwidth of 1 MHz.

The NR operation band 41 may include a UL frequency range of 2496 MHz to 2690 MHz and a DL frequency range of 2496 MHz to 2690 MHz.

The E-UTRA operation band 41 may include a UL frequency range of 2496 MHz to 2690 MHz and a DL frequency range of 2496 MHz to 2690 MHz.

The E-UTRA operation band 30 may include a UL frequency range of 2305 MHz to 2315 MHz and a DL frequency range of 2350 MHz to 2360 MHz.

In the exemplary system described above, methods are described based on a flowchart as a series of steps or blocks, but the present disclosure is not limited to the order of steps, and a certain step may be operated in an order different from the step described above or simultaneously. In addition, an ordinary skilled person in the art may understand that the steps shown in the flowchart are not exclusive, other step may be included, or one or more steps of the flowchart may be deleted without influencing the scope of the present disclosure.

IV. Application Example of a Disclosure of the Present Specification.

An example to which a disclosure of the present specification is applicable is described below.

<General Apparatus to Which a Disclosure of the Present Specification is Applicable>

The embodiments of the present disclosure described above may be implemented through various means. For example, the embodiments of the present disclosure may be implemented by hardware, firmware, software or a combination thereof. Particularly, this is described with reference to drawings.

Hereinafter, an apparatus to which the present disclosure is applicable is described.

Figure 13:
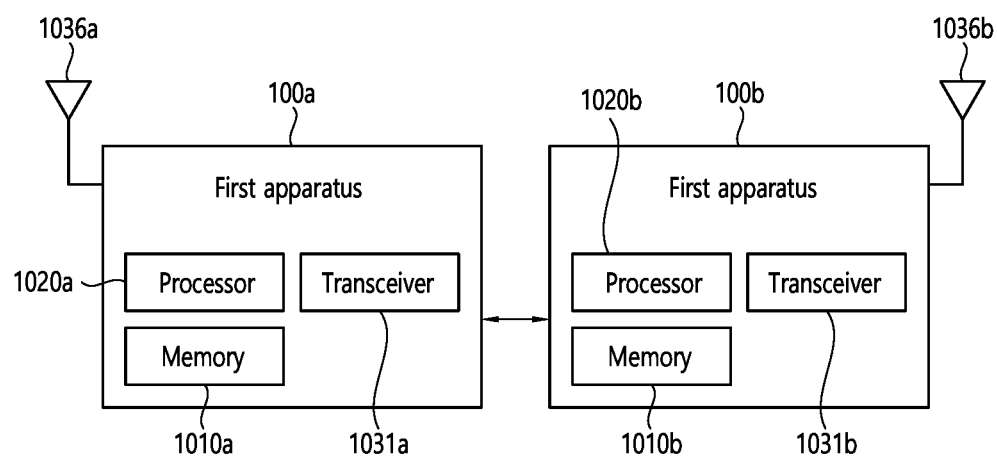
FIG. 13 illustrates a wireless communication system according to an embodiment.

FIG. 13 illustrates a wireless communication system according to an embodiment.

Referring to FIG. 13, a wireless communication system may include a first apparatus 100a and a second apparatus 100b.

The first apparatus 100a may be a base station, a network node, a transmission terminal, a reception terminal, a wireless apparatus, a wireless communication apparatus, a vehicle, a vehicle mounted with an automatic driving function, a Connected Car, a drone (Unmanned Aerial Vehicle, UAV), an AI (Artificial Intelligence) module, a robot, an AR (Augmented Reality) apparatus, a VR (Virtual Reality)

apparatus, an MR (Mixed Reality) apparatus, a hologram apparatus, a public safety apparatus, an MTC apparatus, an IoT apparatus, a medical apparatus, a pin tech apparatus (or financial apparatus), a security apparatus, a climate/environment apparatus, an apparatus related to 5G service, or another apparatus related to the Fourth Industrial Revolution field.

The second apparatus 100b may be a base station, a network node, a transmission terminal, a reception terminal, a wireless apparatus, a wireless communication apparatus, a vehicle, a vehicle mounted with an automatic driving function, a Connected Car, a drone (Unmanned Aerial Vehicle, UAV), an AI (Artificial Intelligence) module, a robot, an AR (Augmented Reality) apparatus, a VR (Virtual Reality) apparatus, an MR (Mixed Reality) apparatus, a hologram apparatus, a public safety apparatus, an MTC apparatus, an IoT apparatus, a medical apparatus, a pin tech apparatus (or financial apparatus), a security apparatus, a climate/environment apparatus, an apparatus related to 5G service, or another apparatus related to the Fourth Industrial Revolution field.

The first apparatus 100a may include at least one memory like a processor 1020a, at least one memory like a memory 1010a and at least one transceiver like a transceiver 1031a. The processor 1020a may perform the above-described function, process and/or methods. The processor 1020a may perform one or more protocols. For example, the processor 1020a may perform one or more layers of a wireless interface protocol. The memory 1010a may be connected to the processor 1020a and store various types of information and/or commands. The transceiver 1031a may be connected to the processor 1020a and may be controlled to transmit and receive a radio signal.

The second apparatus 100b may include at least one memory like a processor 1020b, at least one memory like a memory 1010b and at least one transceiver like a transceiver 1031b. The processor 1020b may perform the above-described function, process, and/or methods. The processor 1020b may perform one or more protocols. For example, the processor 1020b may perform one or more layers of a wireless interface protocol. The memory 1010b may be connected to the processor 1020b and store various types of information and/or commands. The transceiver 1031b may be connected to the processor 1020b and may be controlled to transmit and receive a radio signal.

The memory 1010a and/or the memory 1010b may be connected to an interior or an exterior of the processor 1020a and/or the processor 1020b, respectively, and may also be connected to other processor through various techniques such as a wired or wireless connection.

The first apparatus 100a and/or the second apparatus 100b may have one or more antennas. For example, an antenna 1036a and/or an antenna 1036b may be configured to transmit or receive a radio signal.

Figure 14:
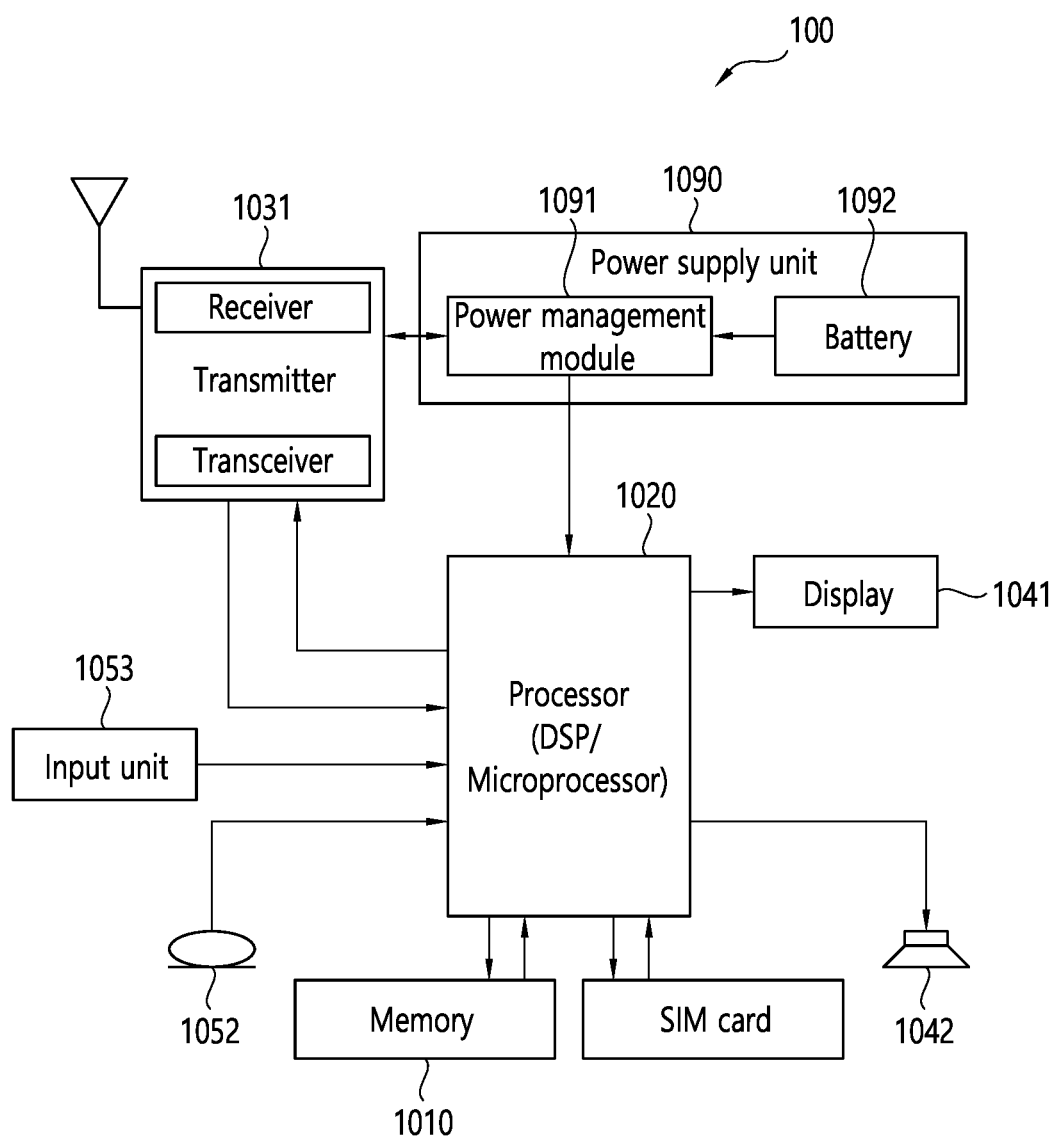
FIG. 14 is a block diagram illustrating a composition of a UE according to an embodiment.

FIG. 14 is a block diagram illustrating a composition of a UE according to an embodiment.

Particularly, FIG. 14 is a diagram illustrating the UE shown in FIG. 13 in more detail.

A UE includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

The processor 1020 may be configured to implement the proposed function, process and/or method described in the present disclosure. Layers of a wireless interface protocol may be implemented in the processor 1020. The processor 1020 may include application-specific integrated circuit (ASIC), other chipset, logical circuit and/or data processing apparatus. The processor 1020 may be an application processor (AP). The processor 1020 may include at least one of a digital signal processor (DSP), a central processing unit (CPU), a graphics processing unit (GPU) and a modulator and demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store international mobile subscriber identity (IMSI) used for identifying a subscriber in a mobile telephoning apparatus such as a mobile phone and a computer and the related key. Many types of contact address information may be stored in the SIM card.

The memory 1010 is operably coupled with the processor 1020 and stores various types of information to operate the processor 1020. The memory may include read-only memory (ROM), random access memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 15:
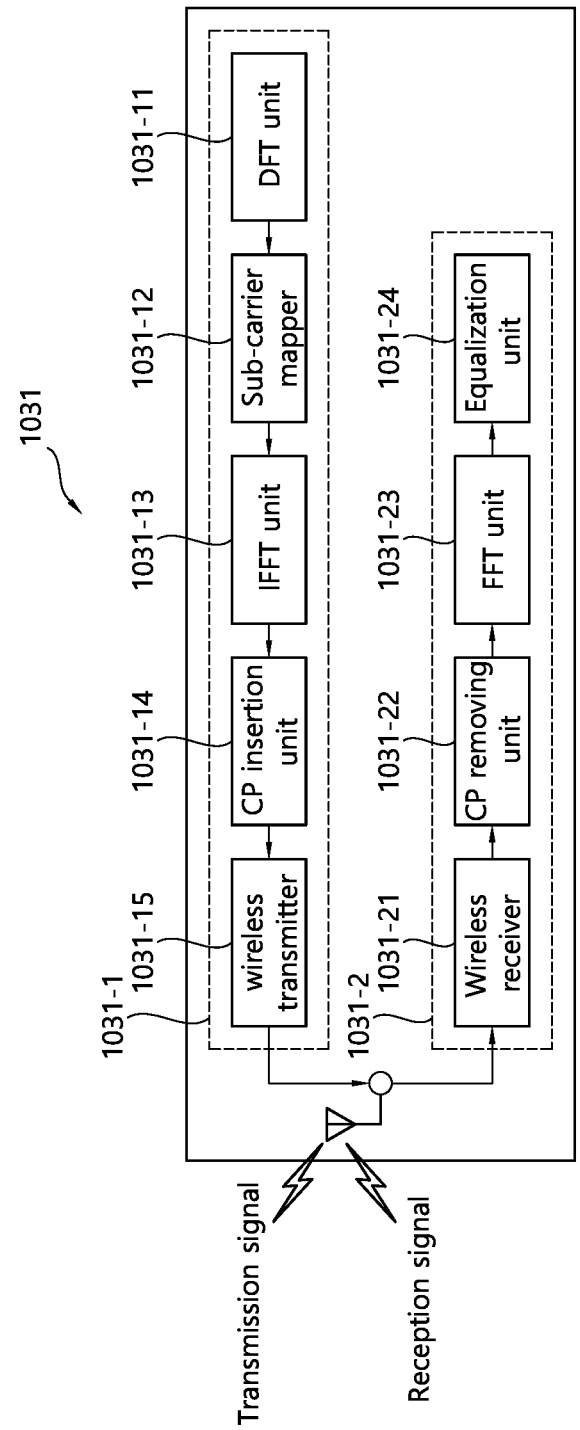
FIG. 15 is a block diagram illustrating the transceiver of the first apparatus shown in FIG. 13 or the transceiver of the UE shown in FIG. 14 in detail.

FIG. 15 is a block diagram illustrating the transceiver of the first apparatus shown in FIG. 13 or the transceiver of the UE shown in FIG. 14 in detail.

Referring to FIG. 15, the transceiver 1031 includes a transmitter 1031-1 and a receiver 1031-2. The transmitter 1031-1 includes a Discrete Fourier Transform (DFT) unit 1031-11, a sub-carrier mapper 1031-12, an IFFT unit 1031-13, a CP insertion unit 1031-14, and a wireless transmitter 1031-15. The transmitter 1031-1 may further include a modulator. In addition, for example, the transmitter 1031-1 may further include a scramble unit (not shown), a modulation mapper (not shown), a layer mapper (not shown), and a layer permutator (not shown), which may be disposed in front of the DFT unit 1031-11. That is, in order to prevent increase of peak-to-average power ratio (PAPR), the transmitter 1031-1 makes information to be going through the DFT unit 1031-11 before mapping a signal to a sub-carrier. After a signal spread (or precoded, in the same meaning) by the DFT unit 1031-11 is sub-carrier mapping through the sub-carrier mapper 1031-12, the signal is transformed into a signal on a time axis through the Inverse Fast Fourier Transform (IFFT) unit 1031-13.

The DFT unit 1031-11 performs DFT on input symbols and outputs complex-valued symbols. For example, when Ntx symbols are input (e.g., Ntx is a natural number), a DFT size is Ntx. The DFT unit 1031-11 may be called a transform precoder. The sub-carrier mapper 1031-12 maps the complex-valued symbols to respective sub-carriers on a frequency domain. The complex-valued symbols may be mapped to resource elements that correspond to a resource block allocated for a data transmission. The sub-carrier mapper 1031-12 may be called a resource element mapper. The IFFT unit 1031-13 performs IFFT for an input symbol and outputs a baseband signal for data, which is a time domain signal. The CP insertion unit 1031-14 copies a part of rear part of a baseband signal for data and inserts it in a front part of a baseband signal for data. Through the CP insertion, inter-symbol interference (ISI) and Inter-Carrier Interference (ICI) are prevented, and orthogonality may be maintained even in a multi-pass channel.

Meanwhile, the receiver 1031-2 includes a wireless receiver 1031-21, a CP removing unit 1031-22, an FFT unit 1031-23 and an equalization unit 1031-23. The wireless receiver 1031-21, the CP removing unit 1031-22 and the FFT unit 1031-23 perform inverse functions of the wireless transmitter 1031-15, the CP insertion unit 1031-14 and the IFFT unit 1031-13. The receiver 1031-2 may further include a demodulator.

V. Scenarios to Which the Disclosure of the Present Specification is Applicable

Hereinafter, scenarios to which the disclosure of the present specification is applicable are described.

<5G Use Scenarios>

Figure 16:
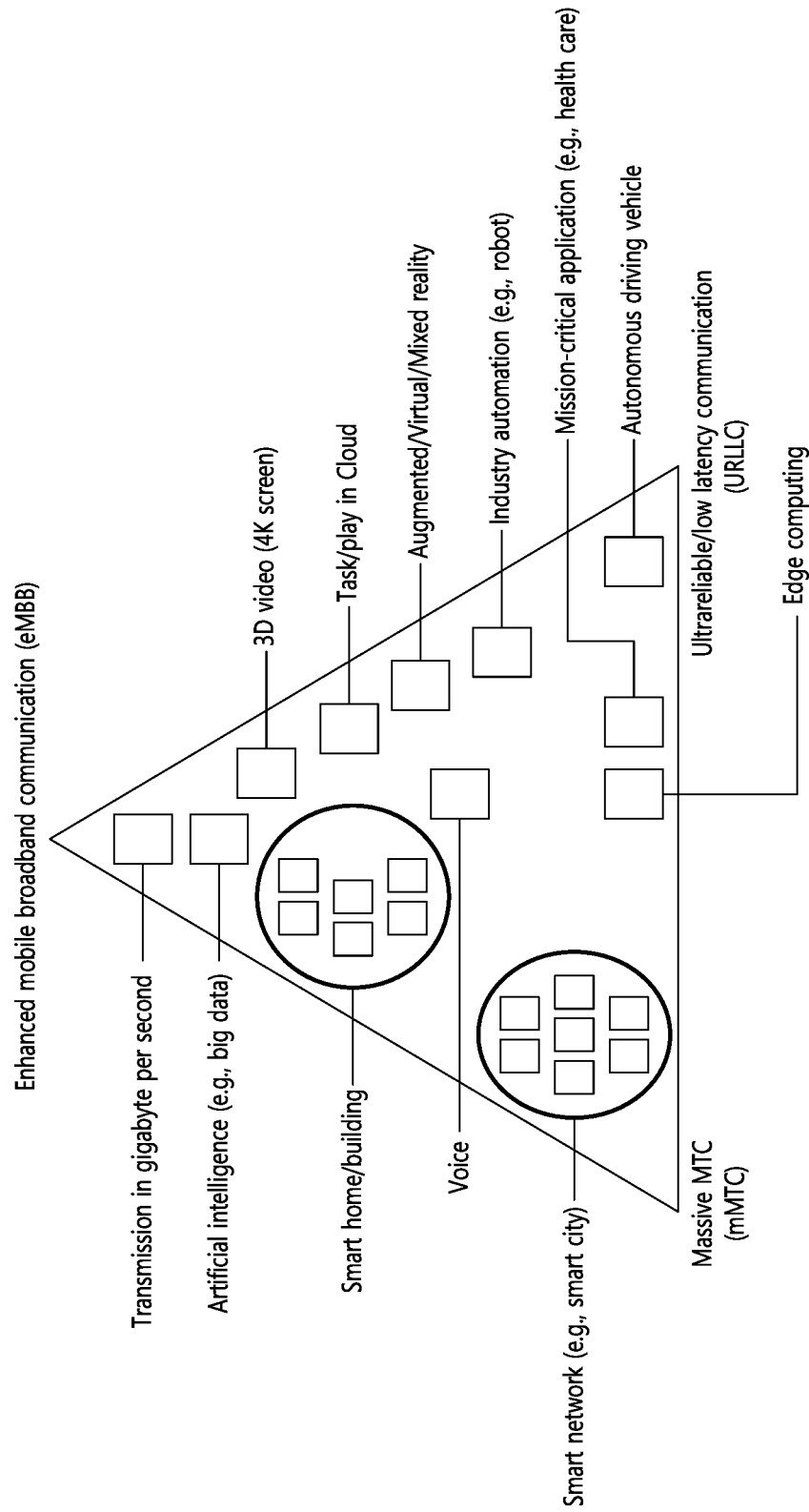
FIG. 16 illustrates an example of 5G use scenarios.

FIG. 16 illustrates an example of 5G use scenarios.

The 5G usage scenarios illustrated in FIG. 16 are merely exemplary, and the technical features of the present disclosure may also be applied to other 5G usage scenarios that are not illustrated in FIG. 16.

Referring to FIG. 16, three major requirement areas of 5G include: (1) an enhanced mobile broadband (eMBB) area, (2) a massive machine type communication (mMTC) area, and (3) an ultra-reliable and low latency communications (URLLC) area. Some examples of usage may require multiple areas for optimization, while other examples of usage may focus only on one key performance indicator (KPI). The 5G supports these various examples of usage in a flexible and reliable way.

The eMBB focuses generally on improvements in data rate, latency, user density, and capacity and coverage of mobile broadband access. The eMBB aims at a throughput of about 10 Gbps. The eMBB makes it possible to far surpass basic mobile Internet access, and covers full-duplex operations, media in cloud or augmented reality, and entertainment applications.

The mMTC, which is designed to enable communication between a large number of low-cost devices powered by batteries, is provided to support smart metering, logistics, fields, and applications such as body sensors. The mMTC aims at about 10-year batteries and/or about one million devices per $km^2$.

The URLLC, which enables devices and machines to communicate with high reliability, very low latency, and high availability, are ideal for vehicle communications, industrial control, factory automation, telesurgery, smart grid, and public safety applications. The URLLC aims at a delay of about 1 ms. The URLLC includes new services that will change the industry through ultra-reliable/low-latency links such as remote control of key infrastructures and autonomous vehicles. Levels of reliability and latency are essential for smart grid control, industrial automation, robotics, and drone control and adjustment.

Next, a plurality of usage examples included in the triangle of FIG. 16 will be described in more detail.

5G, which is a means of providing streams that are rated as hundreds of megabits per second to a gigabit per second, may complement fiber-to-the-home (FTTH) and cable-based broadband (or data over cable service interface specifications (DOCSIS)).

Automotive vehicles are expected to be a new important motive in terms of 5G, together with many usage examples for mobile communications for vehicles.

Smart cities and smart homes, which are referred to as smart societies, will be embedded into high-density wireless sensor networks, for example.

The consumption and distribution of energy, including heat or gas, is being highly decentralized, and requires automated control through distributed sensor networks. Smart grids interconnect these sensors using digital information and communication technologies to collect information and serve accordingly.

In the health sector, there are many applications that may use the benefits of mobile communications. The communication system may support telemedicine providing clinical care from a faraway place.

Wireless and mobile communications are getting increasingly important in industrial applications. Wiring is expensive to install and maintain. Thus, the possibility of replacement with wireless links, which can reconfigure cables, is an attractive opportunity in various industry fields.

Logistics and freight tracking is an important usage example for mobile communications that enables the tracking of inventory and packages anywhere using a location-based information system. The usage example for logistics and freight tracking typically requires a low data transmission rate but requires wide-range and reliable location information.

<Artificial Intelligence (AI)>

Artificial intelligence refers to a field of studying artificial intelligence or a methodology for creating the same, and machine learning refers to a field of defining various problems dealing in an artificial intelligence field and studying methodologies for solving the same. The machine learning may be defined as an algorithm for improving performance with respect to a certain task through repeated experiences with respect to the task.

<Robot>

A robot may refer to a machine which automatically handles a given task by its own ability, or which operates autonomously. Particularly, a robot that functions to recognize an environment and perform an operation according to its own judgment may be referred to as an intelligent robot.

Robots may be classified into, for example, industrial, medical, household, and military robots, according to the purpose or field of use.

A robot may include an actuator or a driving unit including a motor in order to perform various physical operations, such as moving joints of the robot. In addition, a movable robot may include, for example, a wheel, a brake, and a propeller in the driving unit thereof, and through the driving unit, may thus be capable of traveling on the ground or flying in the air.

<Self-Driving or Autonomous-Driving>

Autonomous driving refers to self-driving technology, and an autonomous vehicle refers to a vehicle that moves without any manipulation by a user or with minimum manipulation by a user.

For example, autonomous driving may include all of a technology for keeping a vehicle within a driving lane, a technology for automatically controlling a speed such as an adaptive cruise control, a technology for automatically driving the vehicle along a determined route, and a technology for, when a destination is set, automatically setting a route and driving the vehicle along the route.

A vehicle includes a vehicle having only an internal combustion engine, a hybrid vehicle having both an internal combustion engine and an electric motor, and an electric vehicle having only an electric motor, and may include not only an automobile but also a train, a motorcycle, or the like.

In this case, an autonomous vehicle may be considered as a robot with an autonomous driving function.

<Extended Reality; XR>

Extended reality collectively refers to virtual reality (VR), augmented reality (AR), and mixed reality (MR). The VR technology provides real world objects or backgrounds only in CG images, the AR technology provides virtual CG images together with real object images, and the MR technology is computer graphic technology for mixing and combining virtual objects with the real world.

The MR technology is similar to the AR technology in that both real and virtual objects are shown together. However, there is a difference in that a virtual object is used to complement a real object in the AR technology, whereas a virtual object and a real object are used in an equivalent nature in the MR technology.

The XR technology may be applied to a head-mount display (HMD), a head-up display (HUD), a mobile phone, a tablet PC, a laptop, a desktop, a TV, digital signage, etc. A device to which the XR technology is applied may be referred to as an XR device.

Figure 17:
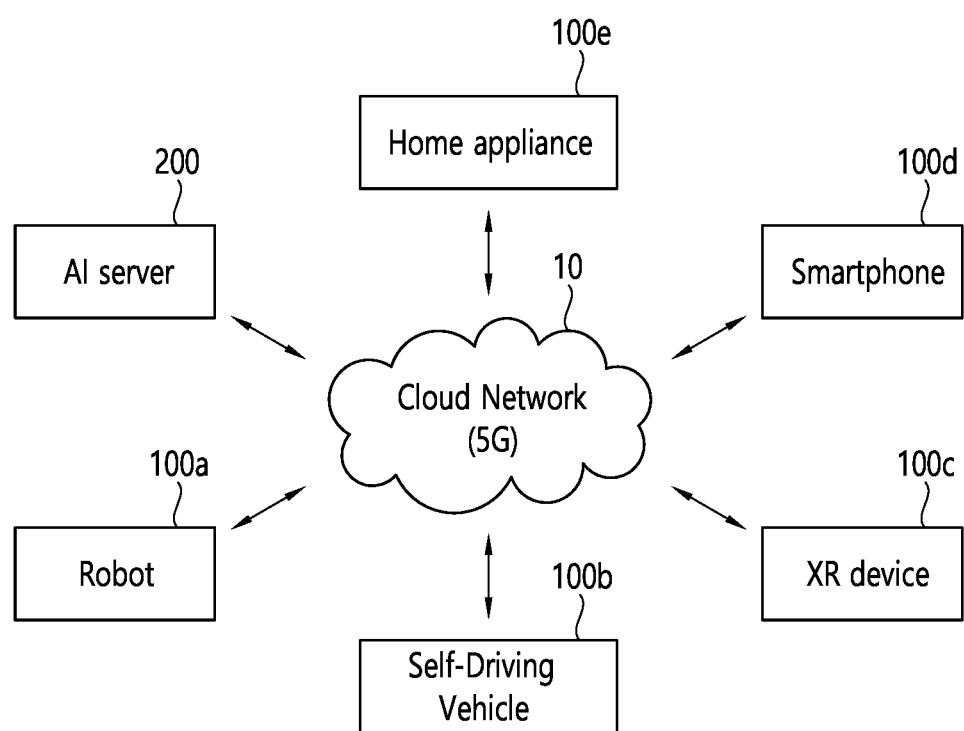
FIG. 17 illustrates an AI system according to an embodiment.

FIG. 17 illustrates an AI system according to an embodiment.

Referring to FIG. 17, an AI system is connected to at least one of an AI server 200, a robot 100a, a self-driving vehicle 100b, an XR device 100c, a smartphone 100d, or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The devices 100a to 100e and 200 configuring the AI system may be interconnected over the cloud network. Particularly, the devices 100a to 100e and 200 may communicate with each other through a base station but may directly communicate with each other without the intervention of a base station.

The AI server 200 is connected to at least one of the robot 100a, the self-driving vehicle 100b, the XR device 100c, the smartphone 100d or the home appliances 100e, that is, AI devices configuring the AI system, over the cloud network and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model and may generate a response or control command based on the deduced result value.

So far, the preferred embodiment of the present disclosure has been described in an exemplary manner. However, since the scope of the present disclosure is not limited to a specific embodiment, the present disclosure may be modified, changed or improved within the inventive concept of the present disclosure or the scope written in the claims.

What is claimed is:

1. A user equipment (UE), supporting Dual Connectivity (DC) with Evolved Universal Terrestrial Radio Access (E-UTRA) and New Radio (NR), comprising:
    a transceiver configured with intra-band non-contiguous DC, and configured to transmit an uplink signal and receive a downlink signal; and
    a processor configured to control the transceiver,
    wherein based on the intra-band non-contiguous DC being configured as E-UTRA operation band 41 and NR operation band n41, the transceiver is configured with a maximum level of a spurious emission, which is −40 dBm, for protected band E-UTRA operation band 30,
    wherein the E-UTRA operation band 30 includes an uplink frequency range of 2305 MHz to 2315 MHz and a downlink frequency range of 2350 MHz to 2360 MHz,
    wherein the E-UTRA operation band 41 includes an uplink frequency range of 2496 MHz to 2690 MHz and a downlink frequency range of 2496 MHz to 2690 MHz, and
    wherein the NR operation band n41 includes an uplink frequency range of 2496 MHz to 2690 MHz and a downlink frequency range of 2496 MHz to 2690 MHz.

2. The UE of claim 1, wherein the maximum level of a spurious emission is based on a minimum bandwidth of 1 MHz.

3. The UE of claim 1, wherein the processor is further configured to receive a network signal related to an additional-maximum power reduction (A-MPR).

4. The UE of claim 3, wherein the maximum level of a spurious emission is based on the network signal related to A-MPR.

5. A method for controlling a transceiver of a user equipment (UE) supporting Dual Connectivity (DC) with Evolved Universal Terrestrial Radio Access (E-UTRA) and New Radio (NR), the method comprising:
  receiving a downlink signal by controlling the transceiver, wherein the transceiver is configured with intra-band non-contiguous DC; and
  transmitting an uplink signal by controlling the transceiver,
  wherein based on the intra-band non-contiguous DC being configured as E-UTRA operation band 41 and NR operation band n41, the transceiver is configured with a maximum level of a spurious emission, which is −40 dBm, for protected band E-UTRA operation band 30,
  wherein the E-UTRA operation band 30 includes an uplink frequency range of 2305 MHz to 2315 MHz and a downlink frequency range of 2350 MHz to 2360 MHz,
  wherein the E-UTRA operation band 41 includes an uplink frequency range of 2496 MHz to 2690 MHz and a downlink frequency range of 2496 MHz to 2690 MHz, and
  wherein the NR operation band n41 includes an uplink frequency range of 2496 MHz to 2690 MHz and a downlink frequency range of 2496 MHz to 2690 MHz.

6. The method of claim 5, wherein the maximum level of a spurious emission is based on a minimum bandwidth of 1 MHz.

7. The method of claim 5, wherein the processor is further configured to receive a network signal related to an additional-maximum power reduction (A-MPR).

8. The UE of claim 7, wherein the maximum level of a spurious emission is based on the network signal related to A-MPR.

* * * * *